(12) United States Patent
Sugie

(10) Patent No.: US 6,252,368 B1
(45) Date of Patent: Jun. 26, 2001

(54) NUMERICALLY CONTROLLED SYSTEM AND BACKLASH COMPENSATION DEVICE FOR USE WITH THE SYSTEM

(75) Inventor: Hiroshi Sugie, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/472,826

(22) Filed: Dec. 28, 1999

(30) Foreign Application Priority Data

Dec. 28, 1998 (JP) .................................................. 10-374544
Nov. 9, 1999 (JP) .................................................. 11-318588

(51) Int. Cl.$^7$ ......................... G05B 19/408; G05B 11/01; G05D 23/275
(52) U.S. Cl. ...................... 318/568.22; 318/630; 318/632
(58) Field of Search .................................... 318/630–632, 318/568.22, 569–570, 600–602

(56) References Cited

U.S. PATENT DOCUMENTS 5,059,881 * 10/1991 Fujita et al. ......................... 318/630
5,767,645 * 6/1998 Park ..................................... 318/600
6,072,297 * 6/2000 Xu et al. .............................. 318/630

FOREIGN PATENT DOCUMENTS 771781 8/1995 (JP) .
10-154007 6/1998 (JP) .

OTHER PUBLICATIONS

Tarng et al., "Identification Of And Compensation For Backlash On The Contouring Accuracy of CNC Machining Centres", International Journal Of Advanced Manufacturing Technology, 1997, pp. 78–85.

* cited by examiner

*Primary Examiner*—Robert E. Nappi
*Assistant Examiner*—Marlon T. Fletcher
(74) *Attorney, Agent, or Firm*—Leydig, Voit & Mayer, ltd.

(57) ABSTRACT

A backlash compensation device for use with a numerically controlled system compensates for a position command signal used to drive and control an object to be controlled. The device includes a reversal detecting unit for detecting a reversal of a direction of driving the object to be controlled based on a reversal of an upward or downward trend in the level of an applied position command signal. A maximum backlash signal generating unit generates a maximum backlash signal corresponding to a maximum value of backlash error every time a reversal of a direction of driving the object is detected. A filter then reduces the level of the maximum backlash signal according to how much time has elapsed since the detected reversal of the driving direction. An adder adds the reduced maximum backlash signal from the filter to the position command signal.

16 Claims, 13 Drawing Sheets

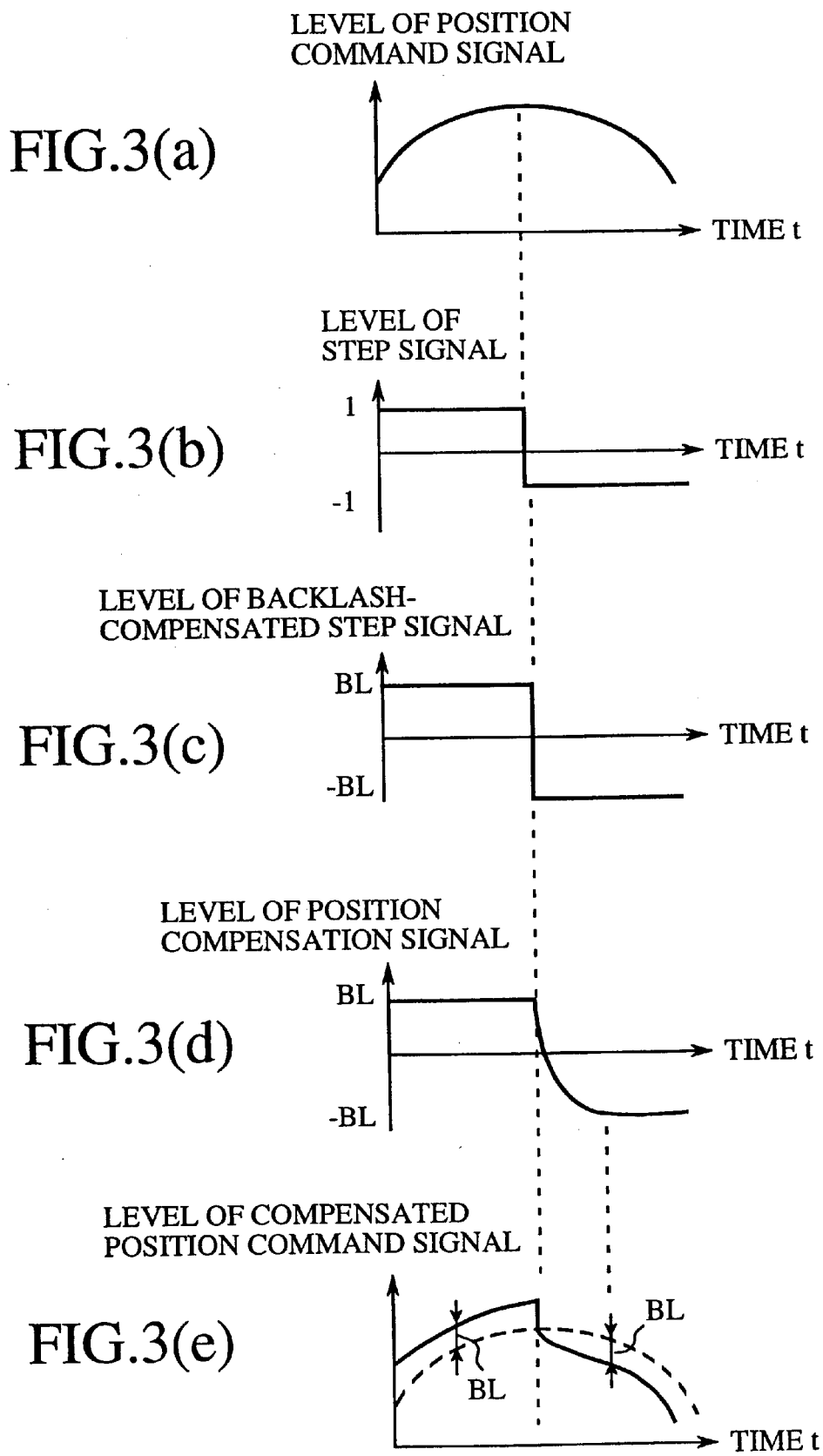

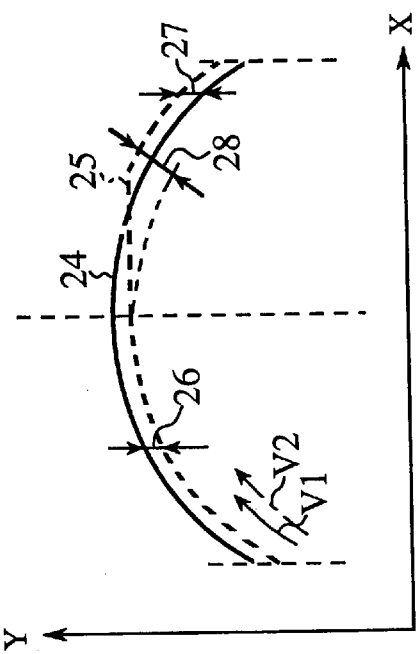
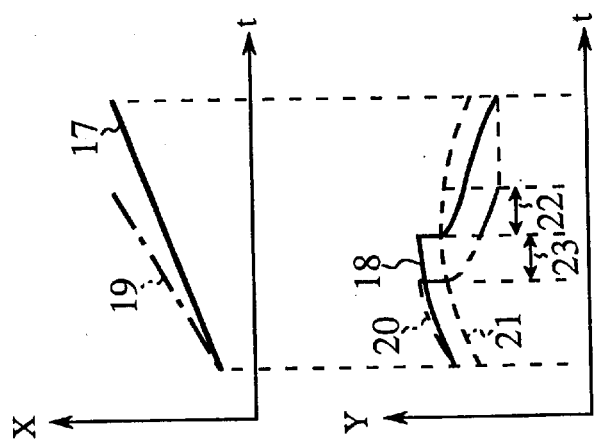
FIG.4(a)   FIG.4(b)   FIG.4(c)

SPRING CONSTANT Km

COEFFICIENT OF VISCOSITY Dm

NUMERICALLY CONTROLLED SYSTEM AND BACKLASH COMPENSATION DEVICE FOR USE WITH THE SYSTEM

BACKGROUND OF THE INVENTION

1. Field of the Invention

The present invention relates to a numerically controlled or NC system, such as an NC machining system, an NC robot system, or an NC carrier system, and a backlash compensation device for use with such an NC system. More particularly, it relates to improvements for compensating for backlash error produced upon a reversal of the direction of driving an object to be controlled.

2. Description of the Prior Art

For example, prior art NC machining systems can machine an object to be machined (or work) into a complicated contour by securing the object to be machined onto a table and numerically controlling the relative distance between the table and a machine tool. In general, NC machining systems provide three servomotors that independently operate on X, Y, and Z axes perpendicular to each other, respectively, and transmit rotational driving forces generated by the three servomotors to members for supporting the table and the machine tool so as to control the relative distance between the table and the machine tool.

In prior art NC systems, typified by such NC machining systems, there can cause a mismatch between desired amounts of relative travel of the table and work, which are given as control values, and the actual amounts of relative travel of the table and work, due to backlash and play in driving force transmitting mechanisms, such as servomotors disposed as driving sources, ballscrews each for transforming rotary movement of each of the servomotors into a linear movement of a table, coupling between each servomotor and each ballscrew, linear guides for defining the direction in which the table moves, and the table to which either an object to be machined (or work) or a machine tool is secured, when the direction of rotation of each servomotor is reversed. As a result, the contouring accuracy cannot be better than the backlash error.

Referring next to FIG. 14, there is illustrated a block diagram showing the structure of a prior art numerically controlled system, as disclosed in Japanese Patent Application Publication (TOKKAIHEI) 10-154007, which is so constructed as to compensate for backlash error. In the figure, reference numeral 4 denotes a motor, numeral 35 denotes a driving force transmitting unit, and numeral 1 denotes an object to be controlled.

Reference numeral 7 denotes a position command generating unit for generating a position command signal, numeral 8 denotes a command reversal determination unit for determining whether the position command signal has just reversed an upward or downward trend in its amplitude or level, that is, whether or not the direction of driving the object 1 has just been reversed, numeral 36 denotes a displacement counter for obtaining a displacement of the object to be controlled since the reversal of the position command signal, numeral 37 denotes a setting unit for setting a maximum value of backlash compensation, numeral 38 denotes a displacement-dependent compensation computation unit for computing a compensation value corresponding to the displacement that the object to be controlled has undergone since the reversal of the position command signal, numeral 39 denotes a compensation differential value computation unit for computing a compensation differential value based on the compensation value from the displacement-dependent compensation computation unit 38 at predetermined intervals for compensation, numeral 40 denotes an adder for adding the compensation differential value to the position command signal, and numeral 41 denotes a control device for supplying a control current whose magnitude depends on the output of the adder 40 to the motor 4.

In operation, every time the position command signal from the position command generating unit 7 reverses an upward or downward trend in its amplitude or level, the command reversal determination unit 8 furnishes reversal information indicating the fact and the displacement counter 36 obtains a displacement that the object to be controlled has undergone since the reversal of the position command signal. Based on the maximum value for backlash compensation from the setting unit 37 and the displacement of the object to be controlled from the displacement counter 36, the displacement-dependent compensation computation unit 38 generates a backlash compensation value corresponding to the displacement that the object to be controlled has undergone since the reversal of the position command signal. The compensation differential value computation unit 39 then computes a compensation differential value from the backlash compensation value at predetermined intervals for compensation, and the adder 40 adds the compensation differential value to the position command signal from the position command generating unit 7. The control device 41 supplies a control current whose magnitude depends on the output of the adder 40 to the servomotor 4, thus controlling the position of the driving force transmitting unit 35 and hence the position of the object 1 to be controlled.

As previously mentioned, prior art numerically controlled systems make it possible to numerically control an object to be controlled so that it further travels a distance corresponding to the backlash error, every time the motor changes a direction of rotation thereof, by adding a backlash compensation value with respect to the reversed direction of rotation of the motor to the position command value.

Since prior art numerically controlled systems gradually increase the backlash compensation value according to the displacement that the object to be controlled has undergone since the reversal of the direction of rotation of the motor in addition to adding the backlash compensation value to the position command value, they can compensate for the backlash error having a tendency to gradually increase since the reversal of the direction of rotation of the motor.

A problem with prior art numerically controlled systems such as NC machining systems is that a high degree of contouring accuracy cannot be achieved. For example, even though the relative feed velocity of the table against the machine tool is reduced to a very low one in order to provide a high degree of contouring accuracy which cannot be achieved with a normal machining velocity, the above-mentioned prior art compensation method based on the displacement of the object to be controlled cannot compensate for the backlash error effectively because the way that the backlash error occurs is changed when the relative feed velocity of the table against the machine tool is very low. Thus, prior art numerically controlled machining systems cannot achieve a desired high degree of contouring accuracy even though the relative feed velocity of the table against the machine tool is reduced to a very low one in order to improve the contouring accuracy. Especially, the problem about the contouring accuracy, which is caused by backlash, can easily arise when machining an object into a perfect circle with multi axis synchronous control.

In prior art numerically controlled systems, the backlash compensation value can be computed at predetermined intervals for compensation in order to improve the contouring accuracy. An exponential computation that needs many arithmetic operations is needed to compute the backlash compensation value. A certain time interval is thus required for every computation of the backlash compensation value at predetermined intervals, and therefore the number of times that the backlash compensation value is updated per time is limited. As a result, the time period during which the backlash error is compensated for with the current backlash compensation value must be increased, and an error introduced into the backlash compensation value with respect to the backlash error can be increased. Thus a desired high degree of contouring accuracy cannot be provided.

Instead of the above-mentioned semi-closed feedback method, a full-closed feedback method comprising the steps of detecting the position of the table, and compensating for the amount of rotation of the motor based on the detected position of the table can be applied to prior art numerically controlled systems in order to reduce backlash error. The full-closed feedback method is not, however, suitable for practical use because in addition to that the number of components required for the full-closed feedback method is increased, the accuracy of positioning each component must be improved, a response delay in the feedback system can introduce an error in the contouring accuracy, and the maximum magnitude of the feed velocity can be reduced.

The inventor has devoted himself to study to solve the above problems and to provide a high degree of contouring accuracy, and has found that while any change in the feed velocity can greatly vary a correlation between a tendency to gradually increase after a reversal of the direction of rotation of each servomotor that the backlash error shows, and the displacement that the object to be controlled has undergone since the reversal of the direction of rotation of each servomotor, any change in the feed velocity can hardly vary a correlation between a tendency to gradually increase after a reversal of the direction of rotation of each servomotor that the backlash error shows, and how much time has elapsed since the reversal of the direction of rotation of each servomotor, that is, the way that the backlash error increases after the reversal of the direction of rotation of each servomotor can hardly vary with respect to the time elapsed since the reversal of the direction of rotation of each servomotor even though the feed velocity is changed. The inventor further found that even in the case of multi axis synchronous control that makes changes in the feed velocity, a correlation between a tendency to gradually increase after a reversal of the direction of rotation of each servomotor that the backlash error shows, and how much time has elapsed since the reversal of the direction of rotation of each servomotor can hardly vary regardless of changes in the feed velocity. The inventor has completed the present invention based on the found correlation.

SUMMARY OF THE INVENTION

The present invention is made to overcome the above problems. It is therefore an object of the present invention to provide a backlash compensation device capable of compensating for backlash error regardless of the magnitude of the feed velocity of an object to be controlled, and a numerically controlled system for performing numerical control with a high degree of accuracy using the backlash compensation device.

It is another object of the present invention to provide a backlash compensation device capable of computing a backlash compensation value with simple arithmetic operations, and a numerically controlled system for performing numerical control with a high degree of accuracy using the backlash compensation device.

In accordance with one aspect of the present invention, there is provided a backlash compensation device for use with a numerically controlled system, for compensating for a position command signal used to drive and control an object to be controlled, the device comprising: a reversal detecting unit for detecting a reversal of a direction of driving the object to be controlled based on a reversal of an upward or downward trend in the level of the position command signal applied thereto, and for furnishing reversal detection information when detecting a reversal of a direction of driving the object to be controlled; a maximum backlash signal generating unit for generating a maximum backlash signal corresponding to a maximum value of backlash error associated with a direction in which the object to be controlled will be moved after the detected reversal of the driving direction, every time it receives the reversal detection information from the reversal detecting unit; a filter unit for reducing the level of the maximum backlash signal from the maximum backlash signal generating unit according to how much time has elapsed since the detected reversal of the driving direction, and for furnishing the reduced maximum backlash signal; and an addition unit for adding the reduced maximum backlash signal from the filter unit to the position command signal, and for furnishing the addition result as a compensated position command signal.

In accordance with a preferred embodiment of the present invention, the filter unit includes a plurality of transfer-function filters, each of which can perform an input signal from the maximum backlash signal generating unit according to an identical transfer function, and each of which, however, has a set of constants, which defines the transfer function, different from that provided by any other transfer-function filter included in the filter unit, for selecting one of the plurality of transfer-function filters according to a feed velocity of the object to be controlled so as to perform a filtering process on the maximum backlash signal from the maximum backlash signal generating unit using the selected transfer-function filter.

In accordance with another preferred embodiment of the present invention, the filter unit performs a specific filtering process on the maximum backlash signal from the maximum backlash signal generating unit, the filtering process being equivalent to a transfer function expressed as:

$$a0/(b2 \cdot s^2 + b1 \cdot s + b0)$$

where a0, b2, b1, and b0 are constants, and s is the Laplace operator. In the case that the filter unit includes the plurality of transfer-function filters, each of them can perform the filtering process on the maximum backlash signal from the maximum backlash signal generating unit according to the above transfer function.

In accordance with another preferred embodiment of the present invention, the filter unit performs a specific filtering process on the maximum backlash signal from the maximum backlash signal generating unit, the filtering process being equivalent to a transfer function expressed as:

$$(a1 \cdot s + a0)/(b2 \cdot s^2 + b1 \cdot s + b0)$$

where a0, b2, b1, and b0 are constants, and s is the Laplace operator. In the case that the filter unit includes the plurality of transfer-function filters, each of them can perform the filtering process on the maximum backlash signal from the maximum backlash signal generating unit according to the above transfer function.

In accordance with another preferred embodiment of the present invention, the filter unit performs a specific filtering process on the maximum backlash signal from the maximum backlash signal generating unit, which is equivalent to a transfer function expressed as:

$$a0/(b1 \cdot s + b0)$$

where a0, b2, b1, and b0 are constants, and s is the Laplace operator. In the case that the filter unit includes the plurality of transfer-function filters, each of them can perform the filtering process on the maximum backlash signal from the maximum backlash signal generating unit according to the above transfer function.

In accordance with another preferred embodiment of the present invention, the filter unit performs a specific filtering process on the maximum backlash signal from the maximum backlash signal generating unit, the filtering process being equivalent to a transfer function expressed as:

$$(a2 \cdot s^2 + a1 \cdot s + a0)/(b2 \cdot s^2 + b1 \cdot s + b0)$$

where a2, a1, a0, b2, b1, and b0 are constants, and s is the Laplace operator. In the case that the filter unit includes the plurality of transfer-function filters, each of them can perform the filtering process on the maximum backlash signal from the maximum backlash signal generating unit according to the above transfer function.

In accordance with another aspect of the present invention, there is provided a numerically controlled system including a backlash compensation device for compensating for a position command signal to generate a compensated position command signal, a control device for generating a control signal based on the compensated position command signal, and driving unit for driving and controlling an object to be controlled according to the control signal, the backlash compensation device comprising: a reversal detecting unit for detecting a reversal of a direction of driving the object to be controlled based on a reversal of an upward or downward trend in the level of the position command signal applied thereto, and for furnishing reversal detection information when detecting a reversal of a direction of driving the object to be controlled; a maximum backlash signal generating unit for generating a maximum backlash signal corresponding to a maximum value of backlash error associated with a direction in which the object to be controlled will be moved after the detected reversal of the driving direction, every time it receives the reversal detection information from the reversal detecting unit; a filter unit for reducing the level of the maximum backlash signal from the maximum backlash signal generating unit according to how much time has elapsed since the detected reversal of the driving direction, and for furnishing the reduced maximum backlash signal; and an addition unit for adding the reduced maximum backlash signal from the filter unit to the position command signal, and for furnishing the addition result as the compensated position command signal to the control device.

In accordance with a preferred embodiment of the present invention, the filter unit performs a specific filtering process on the maximum backlash signal from the maximum backlash signal generating unit, the filtering process being equivalent to a transfer function expressed as:

$$(JL+JM)K/\{JL \cdot JM \cdot s^2 + (JL+JM)D \cdot s + (JL+JM)K\}$$

where JL is an inertia of the object to be controlled, JM is an inertia of the driving unit, K is a spring constant of a spring element placed between the object to be controlled and the driving unit, and D is a coefficient of viscosity of a viscous friction exerted on the spring element.

In accordance with another preferred embodiment of the present invention, the filter unit performs a specific filtering process on the maximum backlash signal from the maximum backlash signal generating unit, the filtering process being equivalent to a transfer function expressed as:

$$\{(JL+JM)K \cdot Kf \cdot s + (JL+JM)K\}/\{JL \cdot JM \cdot s^2 + (JL+JM)D \cdot s + (JL+JM)K\}$$

where JL is an inertia of the object to be controlled, JM is an inertia of the driving unit, K is a spring constant of a spring element placed between the object to be controlled and the driving unit, D is a coefficient of viscosity of a viscous friction exerted on the spring element, and Kf is a constant for compensating for a response delay in the control device.

In accordance with another preferred embodiment of the present invention, the filter unit performs a specific filtering process on the maximum backlash signal from the maximum backlash signal generating unit, the filtering process being equivalent to a transfer function expressed as:

$$K/(D \cdot s + K)$$

where K is a spring constant of a spring element placed between the object to be controlled and the driving unit, and D is a coefficient of viscosity of a viscous friction exerted on the spring element.

In accordance with another preferred embodiment of the present invention, the filter unit performs a specific filtering process on the maximum backlash signal from the maximum backlash signal generating unit, the filtering process being equivalent to a transfer function expressed as:

$$\{K \cdot s^2 + K(KP+KI)s + K \cdot KP \cdot KI\}/\{D \cdot KP \cdot s^2 + KP(D \cdot KI+K)s + K \cdot KP \cdot KI\}$$

where K is a spring constant of a spring element placed between the object to be controlled and the driving unit, D is a coefficient of viscosity of a viscous friction exerted on the spring element, KP is a position loop proportional gain included with the control device, KV is a velocity loop proportional gain included with the control device, and KI is an velocity loop integral gain included with the control device.

In accordance with another preferred embodiment of the present invention, the filter unit performs a specific filtering process on the maximum backlash signal from the maximum backlash signal generating unit, the filtering process being equivalent to a transfer function expressed as:

$$(K \cdot Kd \cdot s^2 + K \cdot s + K \cdot Ki)/\{D \cdot s^2 + (D \cdot Ki+K)s + K \cdot Ki\}$$

where K is a spring constant of a spring element placed between the object to be controlled and the driving unit, D is a coefficient of viscosity of a viscous friction exerted on the spring element, Ki is a position loop integral gain included with the control device, and Kd is a differential gain included with the control device.

Further objects and advantages of the present invention will be apparent from the following description of the preferred embodiments of the invention as illustrated in the accompanying drawings.

BRIEF DESCRIPTION OF THE DRAWINGS

FIGS. 3(a) to 3(e) are timing charts for showing an example of a control operation performed by the one-axis (e.g., X-axis) driving mechanism as shown in FIG. 1 included with the NC machining system according to the first embodiment of the present invention;

FIG. 4(a) is a graph showing a position control signal for the X-axis, whose level varies with time;

FIG. 4(b) is a graph showing a position control signal for the Y-axis, whose level varies with time;

FIG. 4(c) is a graph showing the track of a machine tool that moves against a table;

DETAILED DESCRIPTION OF THE PREFERRED EMBODIMENTS

First Embodiment

Figure 1:
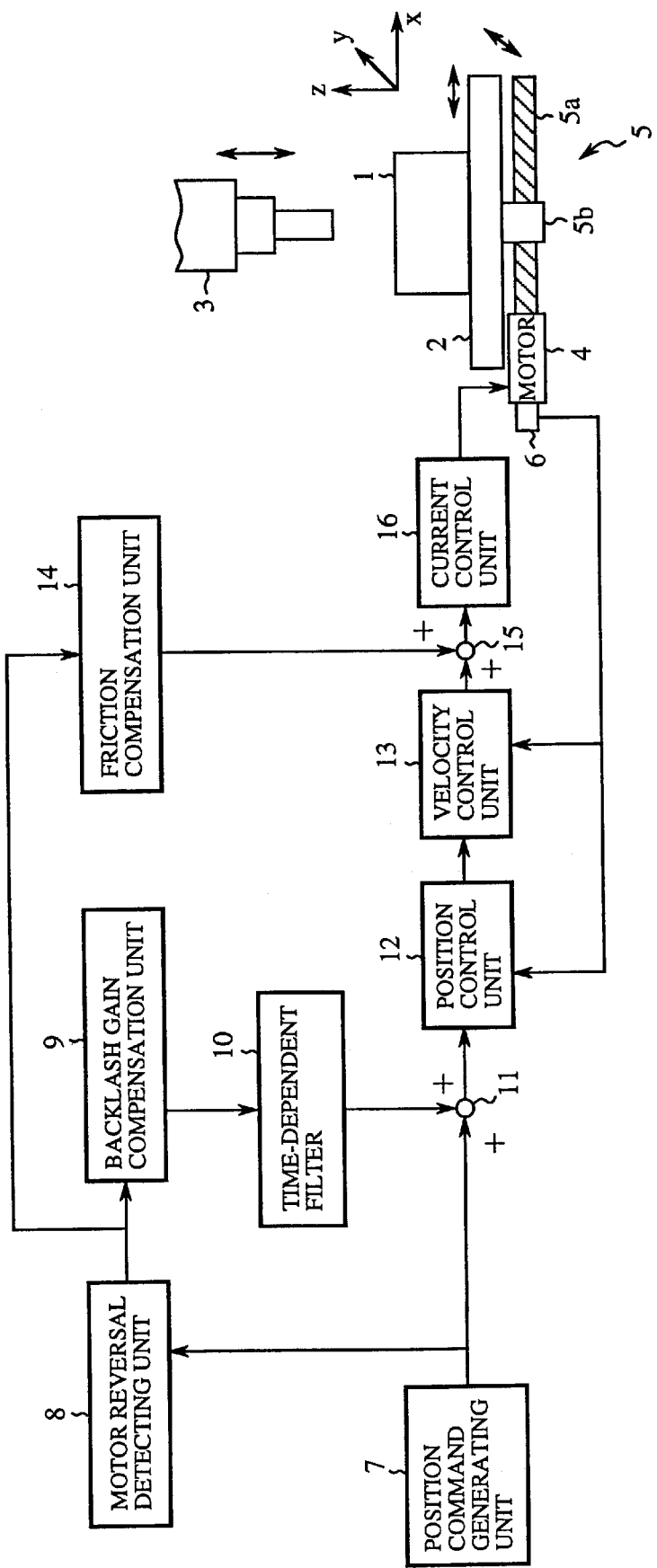
FIG. 1 is a block diagram showing the structure of a one-axis (e.g., X-axis) driving mechanism included with an NC machining system according to a first embodiment of the present invention for numerically controlling the relative distance between a table and a machine tool using a three-axis driving system that operates on X, Y, and Z axes perpendicular to each other.

Referring next to FIG. 1, there is illustrated a block diagram showing the structure of a one-axis (e.g., X-axis) driving mechanism included with an NC machining system according to a first embodiment of the present invention for numerically controlling the relative distance between a table and a machine tool using a three-axis driving system that operates on X, Y, and Z axes perpendicular to each other. In the figure, reference numeral 1 denotes an object to be machined (or work), numeral 2 denotes a table which can be an object to be controlled and onto which the object 1 to be machined is secured, numeral 3 denotes a machine tool such as a drill, which can be an object to be controlled, numeral 4 denotes a servomotor, numeral 5 denotes an X-axis ballscrew comprised of a ballscrew shaft member 5a secured to a rotator of the servomotor 4 and a ballscrew nut member 5b secured to the table 2 and engaged with the screw shaft member 5a, and numeral 6 denotes an encoder for detecting the angle of rotation of the servomotor 4.

Reference numeral 7 denotes a position command generating unit for generating a position command signal including a target coordinate in the direction of the X-axis as level information according to a machining program, numeral 8 denotes a motor reversal detecting unit for generating a step signal having a negative value of 1 every time the received position command signal switches from an upward trend in its level to a downward trend in its level, and for generating a step signal having a positive value of 1 every time the received position command signal switches from a downward trend in its level to an upward trend in its level, numeral 9 denotes a backlash gain compensation unit for holding an X-coordinate value into which a maximum value of backlash error measured in advance is converted, and for multiplying the step signal from the motor reversal detecting unit 8 by the X-coordinate value to generate a step signal having a value equal to the maximum backlash error value, numeral 10 denotes a time-dependent filter for reducing the level of the step signal compensated for by the backlash gain compensation unit 9 to a level corresponding to how much time has elapsed since the position command signal reversed an upward or downward trend in its level, and for furnishing the reduced step signal as a position compensation signal (or backlash compensation value), and numeral 11 denotes an adder for adding the position compensation signal from the time-dependent filter 10 to the position command signal from the position command generating unit 7, and for furnishing the addition result as a compensated position command signal.

Reference numeral 12 denotes a position control unit to which the compensated position command signal from the adder 11 and the motor rotation angle information from the encoder 6 are applied, for generating velocity command information based on the difference between a current X-coordinate determined from the motor rotation angle information and a compensated target X-coordinate determined from the compensated position command signal, and numeral 13 denotes a velocity control unit to which the velocity command information from the position control unit 12 and the motor rotation angle information from the encoder 6 are applied, for generating current command information to make a current velocity in the direction of the X-axis of the table 2, which is determined from the motor rotation angle information, match the velocity command information.

Reference numeral 14 denotes a friction compensation unit for multiplying the step signal applied thereto from the motor reversal detecting unit 8 by a friction compensation gain corresponding to dynamical friction losses, such as a rotation loss in the servomotor 4, a sliding friction loss in the X-axis ballscrew 5, and a sliding friction loss produced between the table 2 and a guide rail not shown, and for furnishing the multiplication result as friction compensation information, numeral 15 denotes an adder for adding the friction compensation information from the friction compensation unit 14 to the current command information from the velocity control unit 13, and for furnishing the addition result as compensated current command information, and numeral 16 denotes a current control unit for generating and feeding a driving current whose magnitude depends on the compensated current command information to the servomotor 4. The position control unit 12, the velocity control unit. 13, and the current control unit 16 constitute a control device.

Figure 2A:
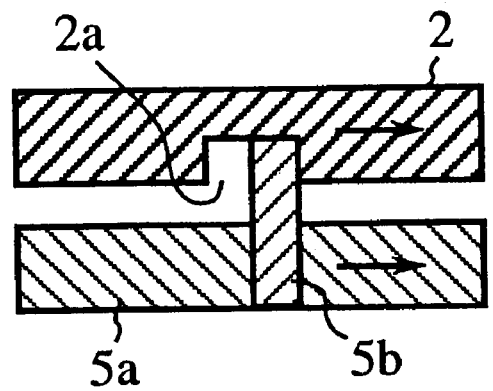
FIGS. 2(a) and 2(b) are views for explaining a reason why backlash error is produced.
Figure 2B:
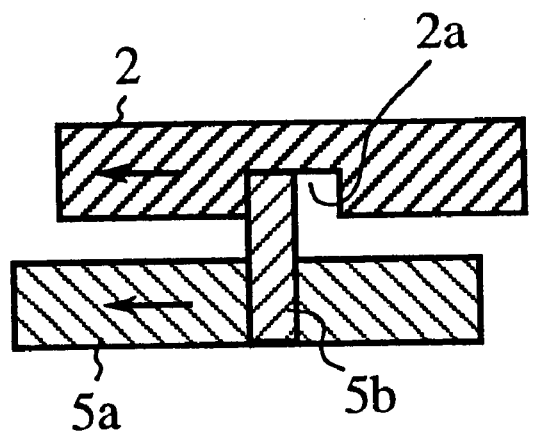

Referring next to FIGS. 2(*a*) and 2(*b*), there are illustrated views for explaining a reason why backlash error is produced. In the figures, reference numeral 2*a* denotes a table recess formed in the lower surface of the table. The ballscrew nut member 5*a* is engaged into the table recess 2*a*. When the driving mechanism switches its moving direction from the right as shown in FIG. 2(*a*) to the left as shown in FIG. 2(*b*), the table 2 remains stopping even though the ballscrew nut member 5*b* is moving within a period of time during which the ballscrew nut member 5*b* moves to the left within the table recess 2*a*. Such a play between the table 2 and the X-axis ballscrew 5 results in a reduction in the position accuracy and hence generation of backlash error.

Referring next to FIGS. 3(*a*) to 3(*e*), there are illustrated timing charts showing an example of a control operation performed by the one-axis (e.g., X-axis) driving mechanism as shown in FIG. 1 included with the NC machining system according to the first embodiment of the present invention. FIG. 3(*a*) shows the waveform of the position command signal furnished by the position command generating unit 7, FIG. 3(*b*) shows the waveform of the step signal furnished by the motor reversal detecting unit 8, FIG. 3(*c*) shows the waveform of the backlash-gain-compensated step signal furnished by the backlash gain compensation unit 9, FIG. 3(*d*) shows the waveform of the position compensation signal furnished by the time-dependent filter 10, and FIG. 3(*e*) shows the waveform of the compensated position command signal furnished by the adder 11. In these figures, the vertical axis shows the signal level, and the horizontal axis shows time. As shown in the figures, once the position command signal switches from an upward trend in its level to a downward trend in its level, the motor reversal detecting unit 8 furnishes a step signal having a negative value of one. The backlash gain compensation unit 9 then changes the amplitude of the step signal so that the step signal has an amplitude equal to the maximum backlash error value. After that, the time-dependent filter 10 reduces the level of the step signal compensated for by the backlash gain compensation unit 9 to a level corresponding to how much time has elapsed since the position command signal switched from an upward trend in its level to a downward trend in its level. The adder 11 then adds the reduced step signal to the position command signal from the position command generating unit 7 so as to generate and furnish a compensated position command signal to the control device.

The position control unit 12 generates velocity command information based on the compensated position command signal from the adder 11, and the velocity control unit 13 then generates current command information based on the velocity command information. The second adder 15 then adds the friction compensation information from the friction compensation unit 14 to the current command information from the velocity control unit 13. The current control unit 16 then feeds a driving current whose magnitude depends on the compensated current command information from the second adder 15 to the servomotor 4, so that the servomotor 4 rotates by an angle corresponding to the driving current. As a result, both the table 2 and the object 1 secured to the table 2 travel a distance corresponding to the rotation angle of the servomotor 4.

For simplicity, the above description is directed to the operation of the X-axis driving mechanism. Needless to say, the NC machining system according to the first embodiment of the present invention further includes similar driving mechanisms for Y and Z axes, therefore moving the object 1 to be machined secured to the table 1 in arbitrary directions with respect to the machine tool 3 by making the three driving mechanisms in synchronization with each other according to a machining program, and thus machining the object 1 into an arbitrary contour based on the track of the machine tool 3 against the object 1 to be machined.

Next, a description will be made as to the relationship between multi axis machining and contouring accuracy, by taking machining of a perfect circle as an example. Referring next to FIGS. 4(*a*) to 4(*c*), there are illustrated diagrams showing the relationship between a position command signal (and a compensated position command signal) and a machined contour, according to the first embodiment of the present invention. FIG. 4(*a*) is a graph showing the position control signal for the X-axis, whose level varies with time, FIG. 4(*b*) is a graph showing the position control signal for the Y-axis, whose level varies with time, and FIG. 4(*c*) shows the track of the machine tool 3 that moves against the table 2. In addition, reference numerals 17 and 18 denote the compensated position command signals for the X and Y axes in the case that the feed velocity is V1, respectively, numerals 19 and 20 denote the compensated position command signals for the X and Y axes in the case that the feed velocity is V2 (>V1), numeral 21 denotes the position command signal in the case of the feed velocity=V1, numerals 22 and 23 denote time periods during which the delay effect by the time-dependent filter 10 occurs, numeral 24 denotes the track of the machine tool 3 against the table 2 when the compensated position command signals are used for both the X and Y axes and the feed velocity=V1 or V2, numeral 25 denotes the track of the machine tool 3 against the table 2 when the compensated position command signal is used for the X axis, the position command signal which is not compensated for is used for the Y axis, and the feed velocity=V1 or V2, numerals 26 and 27 denote backlash remainders in the direction of Y axis, and numeral 28 denotes an error (or maximum error) in the circularity.

As shown in FIGS. 4(*a*) to 4(*c*), according to the first embodiment of the present invention, the backlash gain compensation unit 9 and the time-dependent filter 10 compensate for the position command signal for the Y axis after the servomotor 4 has changed a direction of rotation thereof so that the compensated position command signal smoothly varies. As a result, the machining system of the first embodiment substantially prevents the backlash remainder from being left, thus controlling the relative distance between the table 2 and the machine tool 3 so as to produce a desired track of the machining tool 3 against the table 2.

In addition, even though the feed velocity is changed, the machining system of the first embodiment can substantially prevent the backlash remainder from being produced, thus controlling the relative distance between the table 2 and the machine tool 3 so as to produce a desired track of the machining tool 3 against the table 2.

When no compensation is made to the position command signal for each axis, that is, when the position command signal itself is used to control the relative distance between the table 2 and the machine tool 3, a large error is produced, as shown in FIG. 4(*c*), and the circularity of the track is therefore reduced. In contrast, the machining system of the first embodiment can effectively reduce the error and significantly improve the circularity.

As previously mentioned, the machining system in accordance with the first embodiment of the present invention comprises the motor reversal detecting unit 8 for generating a step signal having a negative or positive value of 1 every time the received position command signal reverses an upward or downward trend in its amplitude or level, the backlash gain compensation unit 9 for holding a coordinate value into which a maximum value of backlash error measured in advance is converted, and for multiplying the step signal from the motor reversal detecting unit by the coordinate value to generate a step signal having a value equal to the maximum backlash error value, the time-dependent filter 10 for reducing the level of the step signal compensated for by the backlash gain compensation unit 9 to a level corresponding to how much time has elapsed since the position command signal reversed an upward or downward trend in its level, and for furnishing the reduced step signal as a position compensation signal (or backlash compensation value), and the adder 11 for adding the position compensation signal to the position command signal and for furnishing the addition result as a compensated position command signal. Accordingly, every time each driving mechanism included with the machining system reverses the direction of driving an object to be controlled, the machining system can generate a step signal whose amplitude corresponds to the maximum backlash error value, reduce the level of the step signal according to how much time has elapsed since each driving mechanism reversed its driving direction, and then add the reduced, compensated step signal to the position command signal from the position command generating unit 7 to produce a compensated position command signal. Accordingly, the first embodiment offers the advantage of being able to reduce the backlash error, which shows a tendency to increase at a nearly constant rate with respect to the elapsed time after the reversal of the direction of rotation of the servomotor regardless of the magnitude of the feed velocity, to a constant level or less using the compensated position command signal regardless of the magnitude of the feed velocity.

Since the machining system of the first embodiment can reduce the backlash error, caused by the table 2, the machine tool 3, and the servomotor 4, to a constant level or less regardless of the magnitude of the feed velocity, it can machine an object with a high degree of accuracy, which prior art machining systems cannot be expected to provide. In addition, the machining system can machine an object into a perfect circle with a high degree of accuracy at a lower feed velocity.

Second Embodiment

Figure 5:
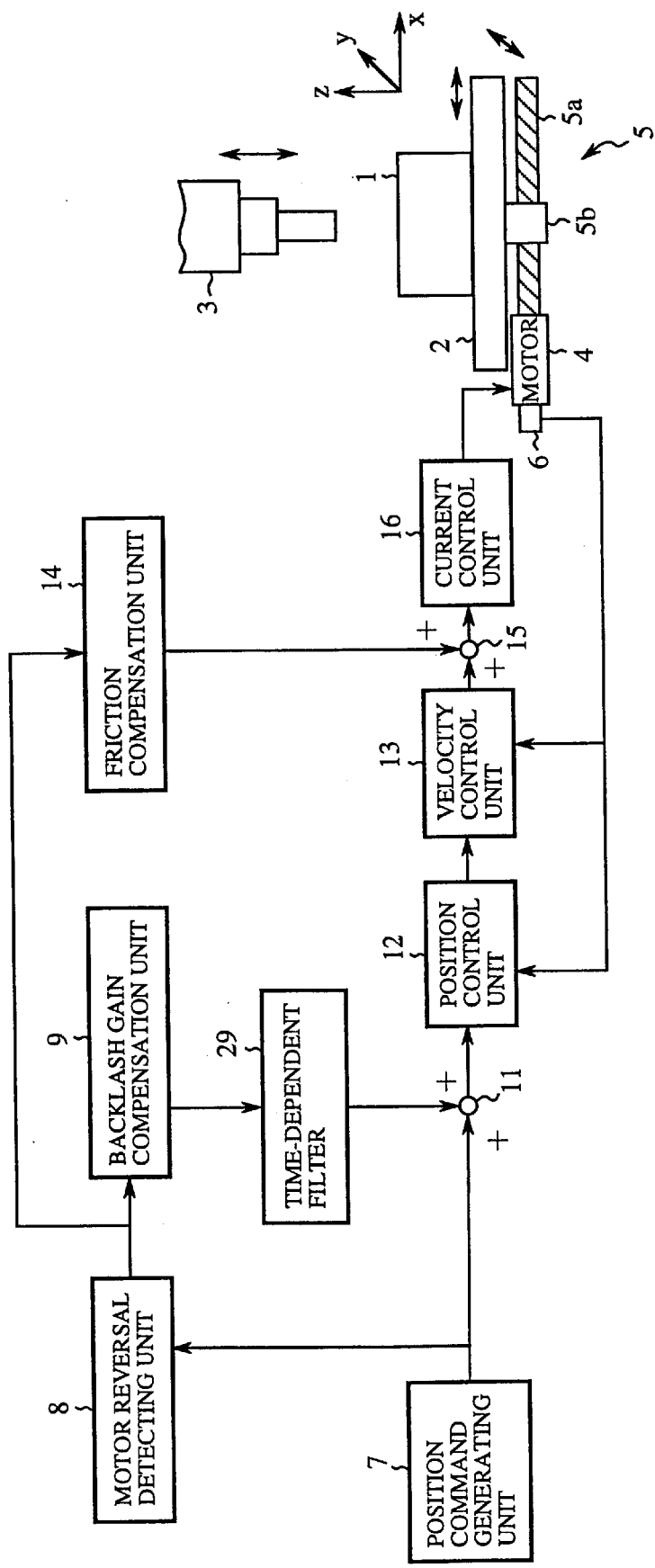
FIG. 5 is a block diagram showing the structure of a one-axis (e.g., X-axis) driving mechanism included with an NC machining system according to a second embodiment of the present invention.

Referring next to FIG. 5, there is illustrated a block diagram showing the structure of a one-axis (e.g., X-axis) driving mechanism included with an NC machining system according to a second embodiment of the present invention. In the figure, reference numeral 29 denotes a time-dependent filter for performing a filtering process, which is equivalent to a second order delay transfer function given by the following equation (10), on a compensated step signal from a backlash gain compensation unit 9 so as to reduce the amplitude of the compensated step signal, and for furnishing the reduced, compensated step signal as a position compensation signal (or backlash compensation value).

$$Y(s) = \{a0/(b2 \cdot s^2 + b1 \cdot s + b0)\} X(s) \quad (10)$$

where $X(s)$ is the compensated step signal, $Y(s)$ is the position compensation signal, $a0$, $b2$, $b1$, and $b0$ are constants, and $s$ is the Laplace operator.

The other structure of the machining system of the second embodiment is the same as that of the machining system of the first embodiment. The same components as of the machining system of the first embodiment are designated by the same reference numerals, and therefore the description of those components will be omitted hereinafter.

As previously mentioned, in accordance with the second embodiment, since the time-dependent filter 29 performs a filtering process, which is equivalent to the second order delay transfer function given by the above equation (10), on the compensated step signal from the backlash gain compensation unit 9 so as to generate a position compensation signal, it can generate the position compensation signal with a few multiplication operations and addition operations. The machining system can thus obtain a new backlash compensation value to be added to the position command signal with the simple operations (e.g., five multiplication operations and four addition operations) without having to perform exponential computations which needs many arithmetic operations, unlike prior art numerically controlled systems. Therefore the machining system of the second embodiment can reduce the time required for performing arithmetic operations to compute a new backlash compensation value to be added to the position command signal. As a result, in addition to reducing the backlash error, caused by the table 2, the machine tool 3, and the servomotor 4, to a constant level or less regardless of the magnitude of the feed velocity, the machining system of the second embodiment can reduce the time required for performing arithmetic operations to compute a new backlash compensation value to be added to the position command signal and hence the length of intervals at which the target position for the position control is updated. Accordingly, the machining system of the second embodiment makes it possible to set the target position for every shorter distance through which the machine tool can move, thus being able to machine the object to be machined with a higher degree of accuracy when the object to be controlled is moved at a low feed velocity.

The filtering process can be implemented via software. In this case, the filtering process can be performed based on the following equation (11) into which the above equation (10) represented with the Laplace operator s is z-converted, for example.

$$Y(z) = [\{4 \cdot a0 \cdot z^2 - 8 \cdot a0 \cdot z + 4 \cdot a0\}/\{(b2 \cdot T^2 + 2 \cdot b1 \cdot T + 4 \cdot b0)z^2 + (2 \cdot b2 \cdot T - 8 \cdot b0)z + (b2 \cdot T^2 - 2 \cdot b1 \cdot T + 4 \cdot b0)\}] X(z) \quad (11)$$

where T is the sampling time of the control system.

The following equation (12) shows an example of the filtering process. The arithmetic operation in the filtering is performed based on the equation (12).

$$Y(n) = A_0 X(n) + A_1 X(n-1) + A_2 X(n-2) - B_1 Y(n-1) - B_2 Y(n-2) \quad (12)$$

where $Y(n)$ is the position compensation signal produced in the current arithmetic operation, $Y(n-1)$ is the position compensation signal produced in the last arithmetic operation, $Y(n-2)$ is the position compensation signal produced in the last arithmetic operation but one, X(n) is the compensated step signal produced in the current arithmetic operation, X(n−1) is the compensated step signal produced in the last arithmetic operation, X(n−2) is the compensated step signal produced in the last arithmetic operation but one, and $A_0=4\cdot a0/(b2\cdot T^2+2\cdot b1\cdot T+4\cdot b0)$, $A_1=-8\cdot a0/(b2\cdot T^2+2\cdot b1\cdot T+4\cdot b0)$, $A_2=4\cdot a0/(b2\cdot T^2+2\cdot b1\cdot T+4\cdot b0)$, $B_1=(2\cdot b2\cdot T-8\cdot b0)/(b2\cdot T^2+2\cdot b1\cdot T+4\cdot b0)$, and $B_2=(b2\cdot T^2-2\cdot b1\cdot T+4\cdot b0)/(b2\cdot T^2+2\cdot b1\cdot T+4\cdot b0)$ are filter coefficients calculated in advance.

Third Embodiment

Figure 6:
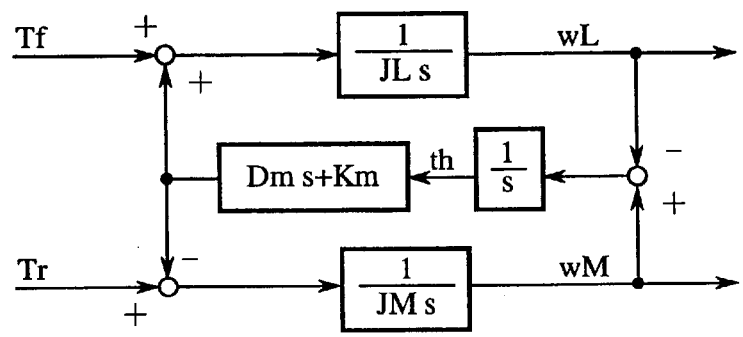
FIG. 6 is a control block diagram of a modeled driving system with backlash showing a tendency to increase gradually, which is represented with the Laplace operator s, in accordance with a third embodiment of the present invention.

Referring next to FIG. 6, there is illustrated a control block diagram of a modeled driving system with backlash showing a tendency to increase gradually, which is represented with the Laplace operator s. In the figure, Tr is a motor drive torque, Tf is a dynamical friction torque, wM is a motor rotation angular velocity, and wL is a table velocity whose value is converted to an equivalent value corresponding to the motor rotation angular velocity.

In addition, JL is a load inertia, such as a designed or measured value of the moment of inertia of part of the driving system (or mechanism) on the side of an object to be controlled, JM is a motor inertia, such as a designed or measured value of the moment of inertia of a driving unit, i.e., servomotor of the driving system, th is a torsion angle of a spring element placed between the servomotor 4 and the table 2, Km is the spring constant of the spring element placed between the servomotor 4 and the table 2, and Dm is the coefficient of viscosity of a viscous friction exerted on the spring element.

Figure 7A:
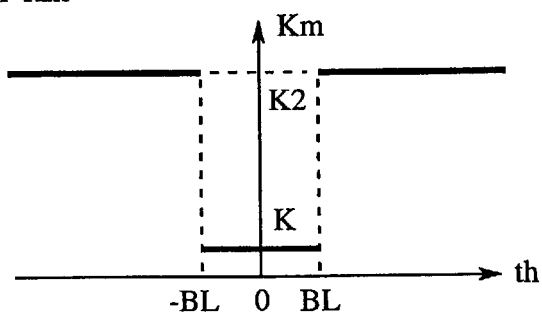
FIG. 7(a) is a graph showing the relationship between a spring constant Km and a torsion angle th, in the third embodiment of the present invention.
Figure 7B:
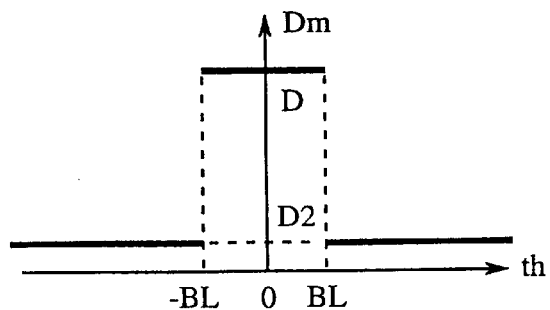
FIG. 7(b) is a graph showing the relationship between a coefficient of viscosity Dm and the torsion angle th, in the third embodiment of the present invention.

FIG. 7(a) is a graph showing the relationship between the spring constant Km and the torsion angle th, and FIG. 7(b) is a graph showing the relationship between the coefficient of viscosity Dm and the torsion angle th. When the absolute value of the torsion angle th lies in a range less than the maximum value BL of backlash error, it can be assumed that the spring constant Km has a small value of K. In contrast, when the absolute value of the torsion angle th lies in a range greater than the maximum backlash error value BL, it can be assumed that the spring constant Km has a large value of K2. When the absolute value of the torsion angle th lies in a range less than the maximum backlash error value BL, it can be assumed that the coefficient of viscosity Dm has a large value of D. In contrast, when the absolute value of the torsion angle th lies in a range greater than the maximum backlash error value BL, it can be assumed that the coefficient of viscosity Dm has a small value of D2. The former value D can be set by measuring the time-varying backlash error so that the backlash compensation value to be added to the position command signal varies with time in a manner similar to that the backlash error varies with time. K is equal to the spring constant of a spring element placed between the object to be controlled and the driving unit, i.e., servomotor, which is given by the following equation (13) when the maximum backlash error value is BL.

$$K=Tf/BL \tag{13}$$

In addition, D, which is the coefficient of viscosity of the viscous friction exerted on the spring element, can be set by measuring the time-varying backlash error so that the backlash compensation value varies with time in a manner similar to that the backlash error varies with time.

In the above-mentioned model, when −Tf is applied, as the motor drive torque Tr, to eliminate the effect of the dynamical friction torque Tf, the torsion angle th is given by the following equation (14). In this case, the torsion angle th is equal to the backlash error.

$$th=[(JL+JM)/\{JL\cdot JM\cdot s^2+(JL+JM)D\cdot s+(JL+JM)K\}]Tf \tag{14}$$

Furthermore, since the maximum backlash error value BL is given as:

$$BL=Tf/K \tag{15}$$

By substituting Tf=BL*K into the above equation (14), the backlash error th is given by the following equation (16):

$$th=[(JL+JM)K/\{JL\cdot JM\cdot s^2+(JL+JM)D\cdot s+(JL+JM)K\}]BL \tag{16}$$

In addition, constants given by the following equations (17) to (20) are substituted into the above equation (10).

$$a0=(JL+JM)K \tag{17}$$

$$b2=JL\cdot JM \tag{18}$$

$$b1=(JL+JM)D \tag{19}$$

$$b0=(JL+JM)K \tag{20}$$

The other structure and operation of the machining system according to the third embodiment of the present invention are the same as those of the machining system according to the second embodiment, and therefore the description of the other structure and operation of the machining system according to the third embodiment will be omitted hereinafter.

In this manner, the backlash showing a tendency to increase gradually can be compensated for with a high degree of accuracy by modeling the performance of the driving mechanism with the backlash showing a tendency to increase gradually using a model in which the backlash is assumed to be caused by a torsion spring with low torsional stiffness that poses a limitation on the maximum angle of torsion and a large viscous friction is exerted on a displacement of the torsion spring, and by substituting the characteristic values given by the above equations (17) to (20), as constant values, into the equation (10).

As previously mentioned, in accordance with the third embodiment of the present invention, the performance of the driving mechanism with the backlash showing a tendency to increase gradually can be modeled using a model in which the backlash is assumed to be caused by a torsion spring with low torsional stiffness that poses a limitation on the maximum angle of torsion and a large viscous friction is exerted on a displacement of the torsion spring. Furthermore, the characteristic values calculated with the modeling, as constant values, into the equation (10) representing the time-dependent filter. Accordingly, the machining system of the third embodiment can compensate for the backlash showing a tendency to increase gradually with a high degree of accuracy and reduce the backlash error to a constant level or less regardless of the magnitude of the feed velocity. In addition, since the machining system can reduce the time required for performing arithmetic operations to compute a new backlash compensation value, it can machine an object with a high degree of accuracy, which prior art machining systems cannot be expected to provide. Furthermore, the machining system can machine an object into a perfect circle with a high degree of accuracy at a lower feed velocity.

Fourth Embodiment

Figure 8:
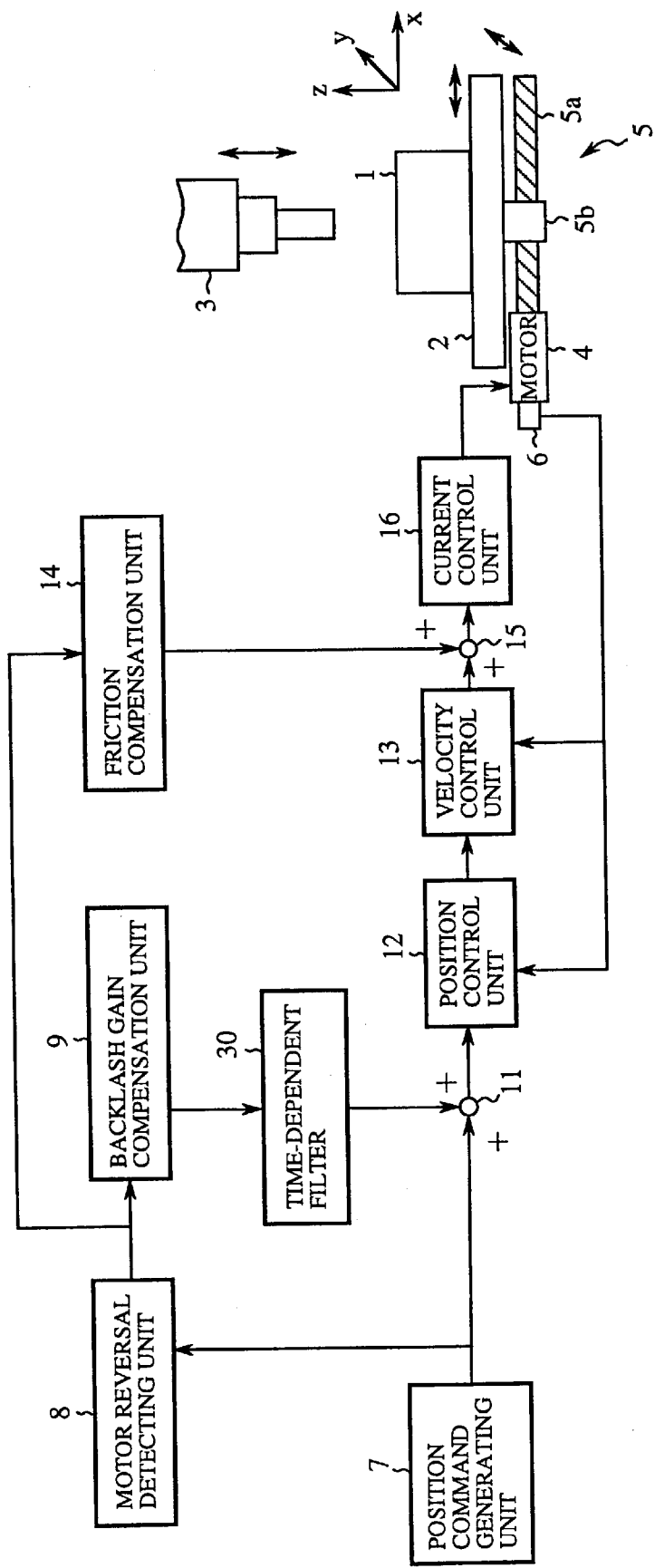
FIG. 8 is a block diagram showing the structure of a one-axis (e.g., X-axis) driving mechanism included with an NC machining system according to a fourth embodiment of the present invention.

Referring next to FIG. 8, there is illustrated a block diagram showing the structure of a one-axis (e.g., X-axis) driving mechanism included with an NC machining system according to a fourth embodiment of the present invention. In the figure, reference numeral 30 denotes a time-dependent filter for performing a filtering process, which is equivalent to a second order delay transfer function given by the following equation (21), on a compensated step signal from a backlash gain compensation unit 9 so as to reduce the amplitude of the compensated step signal, and for furnishing the reduced, compensated step signal as a position compensation signal (or backlash compensation value).

$$Y(s)=\{(a1 \cdot s+a0)/(b2 \cdot s^2+b1 \cdot s+b0)\}X(s) \qquad (21)$$

where a1, a0, b2, b1, and b0 are constants, and s is the Laplace operator.

The other structure of the machining system of the fourth embodiment is the same as that of the machining system of the first embodiment. The same components as of the machining system of the first embodiment are designated by the same reference numerals, and therefore the description of those components will be omitted hereinafter.

As previously mentioned, in accordance with the fourth embodiment, since the time-dependent filter 30 performs a filtering process, which is equivalent to the second order delay transfer function given by the above equation (21), on the compensated step signal from the backlash gain compensation unit 9 so as to generate the position compensation signal, it can generate the backlash compensation value with a few multiplication operations and addition operations. The machining system according to the fourth embodiment can thus obtain the backlash compensation value with the simple operations without having to perform exponential computations which needs many arithmetic operations, unlike prior art numerically controlled systems. Therefore the machining system can significantly reduce the time required for performing arithmetic operations to compute a new backlash compensation value. As a result, in addition to reducing the backlash error, caused by the table 2, the machine tool 3, and the servomotor 4, to a constant level or less regardless of the magnitude of the feed velocity, the machining system of the fourth embodiment can significantly reduce the time required for performing arithmetic operations to compute a new backlash compensation value and hence the length of intervals at which the target position for the position control is updated. Accordingly, the machining system of the fourth embodiment makes it possible to set the target position for every shorter distance through which the object to be controlled is moved, thus being able to machine the object with a higher degree of accuracy when the object to be controlled is moved at a low velocity.

The filtering process can be implemented via software. In this case, the filtering process can be performed based on the following equation (22) into which the above equation (21) represented with the Laplace operator s is z-converted, for example.

$$Y(z)=[\{(2 \cdot a1 \cdot T+4 \cdot a0)z^2-8 \cdot a0 \cdot z+(-2 \cdot a1 \cdot T+4 \cdot a0)\}/\{b2 \cdot T^2+2 \cdot b1 \cdot T+4 \cdot b0)z^2$$

$$+(2 \cdot b2 \cdot T-8 \cdot b0)z+(b2 \cdot T^2-2 \cdot b1 \cdot T+4 \cdot b0)\}]X(z) \qquad (22)$$

where T is the sampling time of the control system.

Fifth Embodiment

In accordance with a fifth embodiment, constants given by the following equations (23) to (27) are substituted into the above equation (21).

$$a1=(JL+JM)K \cdot Kf \qquad (23)$$

$$a0=(JL+JM)K \qquad (24)$$

$$b2=JL \cdot JM \qquad (25)$$

$$b1=(JL+JM)D \qquad (26)$$

$$b0=(JL+JM)K \qquad (27)$$

where JL is an inertia of an object to be controlled, JM is an inertia of a driving unit or servomotor, Km is the spring constant of a spring element placed between the object to be controlled and the driving unit, D is a coefficient of viscosity of a viscous friction exerted on the spring element, and Kf is a constant to compensate for a response delay in a control device for controlling the object to be controlled.

By measuring the time-varying backlash error, D can be set so that the backlash compensation value varies with time in a manner similar to that the backlash error varies with time. By performing observations on the movement of the object to be controlled which has been backlash-compensated, Kf can be set so that the object to be controlled moves as controlled by the position command as possible.

The other structure and operation of the machining system according to the fifth embodiment of the present invention are the same as those of the machining system according to the fourth embodiment, and therefore the description of the other structure and operation of the machining system according to the fifth embodiment will be omitted hereinafter.

By measuring the dynamical friction torque Tf and the maximum backlash error value BL, the spring constant K is determined by the following equation (28).

$$K=Tf/BL \qquad (28)$$

And, the response delay in the numerically control device is approximated by the following equation (29).

$$thM=\{1/(Td \cdot s+1)\}thR \qquad (29)$$

where thM is the angle of rotation of a servomotor 4, TN is the time constant of the response delay in the numerically control device, and thR is the rotation angle command or position command to rotate the servomotor 4.

In order to make thM equal to the backlash error th given by the equation (16), the position command thR, in which the response delay in the numerically control device is compensated for, given by the following equation (30) has to be used.

$$thR=(Kf \cdot s+1)th \qquad (30)$$

where Kf=Td.

As a result, the backlash compensation value in consideration with the response delay in the numerically control device is represented by the following equation (31).

$$thR=[\{(JL+JM)K \cdot Kf \cdot s+(JL+JM)K\}/\{JL \cdot JM \cdot s^2+(JL+JM)D \cdot s+(JL+JM)K\}]BL \qquad (31)$$

In this manner, the backlash showing a tendency to increase gradually can be compensated for with a high degree of accuracy while taking the response delay in the control device into account, by modeling the performance of the driving mechanism with the backlash showing a tendency to increase gradually using a model in which the backlash is assumed to be caused by a torsion spring with low torsional stiffness that poses a limitation on the maximum angle of torsion and a large viscous friction is exerted on a displacement of the torsion spring, and by substituting the characteristic values given by the above equations (23) to (27) with consideration given to the response delay in the control device, as constant values, into the equation (21).

As previously mentioned, in accordance with the fifth embodiment of the present invention, the performance of the driving mechanism with the backlash showing a tendency to increase gradually can be modeled using a model in which the backlash is assumed to be caused by a torsion spring with low torsional stiffness that poses a limitation on the maximum angle of torsion and a large viscous friction is exerted on a displacement of the torsion spring. Furthermore, the characteristic values calculated with the above equations (23) to (27) with consideration given to the response delay in the control device, as constant values, into the equation (21) representing the time-dependent filter. Accordingly, the machining system of the fifth embodiment can reduce the backlash error caused by the object to be controlled and the driving unit (or servomotor) to a constant level or less regardless of the magnitude of the feed velocity. Furthermore, the machining system of the fifth embodiment can also reduce the backlash error caused by the response delay in the control device to a constant level or less. In addition, since the machining system can reduce the time required for performing arithmetic operations to compute a new backlash compensation value, it can machine an object with a high degree of accuracy, which prior art machining systems cannot be expected to provide. Furthermore, the machining system can machine an object into a perfect circle with a high degree of accuracy at a lower feed velocity.

Sixth Embodiment

Figure 9:
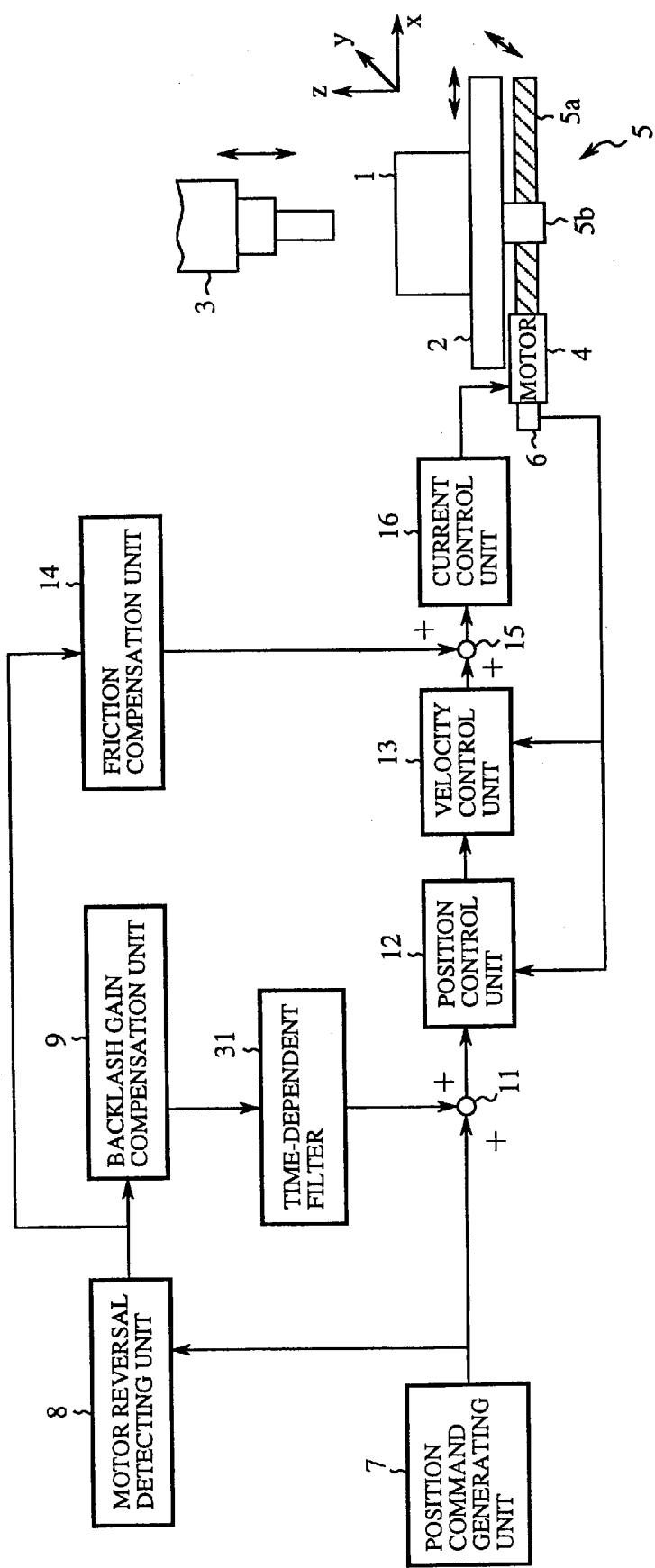
FIG. 9 is a block diagram showing the structure of a one-axis (e.g., X-axis) driving mechanism included with an NC machining system according to a sixth embodiment of the present invention.

Referring next to FIG. 9, there is illustrated a block diagram showing the structure of a one-axis (e.g., X-axis) driving mechanism included with an NC machining system according to a sixth embodiment of the present invention. In the figure, reference numeral 31 denotes a time-dependent filter for performing a filtering process, which is equivalent to a second order delay transfer function given by the following equation (32), on a compensated step signal from a backlash gain compensation unit 9 so as to reduce the amplitude of the compensated step signal, and for furnishing the reduced, compensated step signal as a position compensation signal (or backlash compensation value).

$$Y(s) = \{a0/(b1 \cdot s + b0)\} X(s) \qquad (32)$$

where a0, b1, and b0 are constants and s is the Laplace operation.

The other structure of the machining system of the sixth embodiment is the same as that of the machining system of the first embodiment. The same components as of the machining system of the first embodiment are designated by the same reference numerals, and therefore the description of those components will be omitted hereinafter.

As previously mentioned, in accordance with the sixth embodiment, since the time-dependent filter 31 performs a filtering process, which is equivalent to the first order delay transfer function given by the above equation (32), on the compensated step signal from the backlash gain compensation unit 9 so as to generate the position compensation signal, it can generate the position compensation signal with a few multiplication operations and addition operations. The machining system according to the sixth embodiment can thus obtain the backlash compensation value with the simple operations without having to perform exponential computations which needs many arithmetic operations, unlike prior art numerically controlled systems. Therefore the machining system can significantly reduce the time required for performing arithmetic operations to compute a new backlash compensation value. As a result, in addition to reducing the backlash error, caused by the table 2, the machine tool 3, and the servomotor 4, to a constant level or less regardless of the magnitude of the feed velocity, the machining system of the sixth embodiment can significantly reduce the time required for performing arithmetic operations to compute a new backlash compensation value and hence the length of intervals at which the target position for the position control is updated. Accordingly, the machining system of the sixth embodiment makes it possible to set the target position for every shorter distance through which the object to be controlled is moved, thus being able to machine the object to be machined with a higher degree of accuracy when the object to be controlled is moved at a low feed velocity.

The filtering process can be implemented via software. In this case, the filtering process can be performed based on the following equation (33) into which the above equation (32) represented with the Laplace operator s is z-converted, for example.

$$Y(z) = [(a0 \cdot T \cdot z + a0 \cdot T)/\{(2 \cdot b1 + b0 \cdot T)z + (-2 \cdot b1 + b0 \cdot T)\}] X(z) \qquad (33)$$

where T is the sampling time of the control system.

Seventh Embodiment

Figure 10:
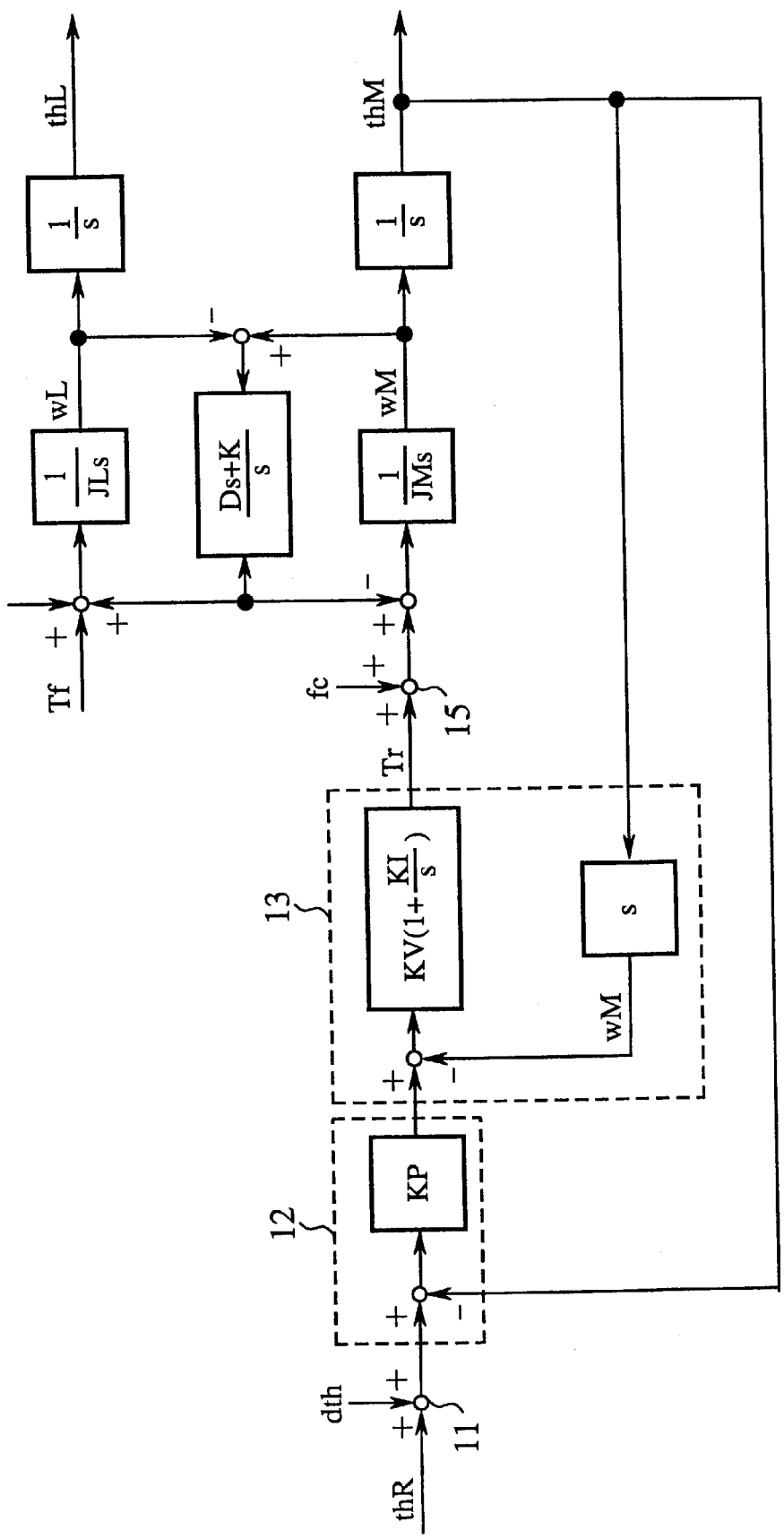
FIG. 10 is a control block diagram of a modeled driving system with backlash showing a tendency to increase gradually, which is represented with the Laplace operator s, in accordance with a seventh embodiment of the present invention.

Referring next to FIG. 10, there is illustrated a control block diagram of a modeled driving system with backlash showing a tendency to increase gradually, which is represented with the Laplace operator s. In the figure, thR is a rotation angle command or position command, dth is a backlash compensation value, Tr is a torque command, Tf is a dynamical friction torque, fc is a friction compensation torque, wM is a motor rotation angular velocity, thM is a motor rotation angle, and thL is a table position whose value is converted to an equivalent value corresponding to the motor rotation angle. The friction compensation torque fc has the same magnitude as the dynamical friction torque Tf and has a sign opposite to that of the dynamical friction torque, in order to eliminate the effect of the dynamical friction torque Tf.

In addition, JL is an inertia of an object to be controlled, JM is an inertia of a driving unit or servomotor, K is the spring constant of a spring element placed between the servomotor 4 and the table 2, D is a coefficient of viscosity of a viscous friction exerted on the spring element, KP is a position loop proportional gain included in a position control unit 12, KV is a velocity loop proportional gain included in a velocity control unit 13, and KI is a velocity loop integral gain included in the velocity control unit 13. Since a current control unit 16 has a high response, it can be assumed that the term associated with the current control unit 6 can be neglected.

In the above-mentioned model, the table position thL is given by the following equation (34) using the rotation angle command thR, the backlash compensation value dth, and the dynamical friction torque Tf.

$$thL = \{KP \cdot V(D \cdot s + K)(thR + dth) + (JM \cdot s^2 + V \cdot s + KP \cdot V)Tf\}/(A \cdot s^2 + B \cdot V \cdot s + B \cdot KP \cdot V) \qquad (34)$$

where $V = KV(1 + KI/s)$, $A = JL \cdot JM \cdot s^2 + (JL + JM)D \cdot s + (JL + JM)K$, and $B = JL \cdot s^2 + D \cdot s + K$.

The backlash compensation value dth to eliminate the effect of the dynamical friction torque Tf exerted on the table position thL is calculated with the following equation (35).

$$dth = -(JM \cdot s^2 + V \cdot s + KP \cdot V)Tf/\{(D \cdot s + K)KP \cdot V\} \qquad (35)$$

Assuming that the position loop proportional gain KP is sufficiently large (or KP=∞) and the position control unit 12 can give a quick response as compared with a time-varying change in the backlash error, the above equation (35) can be transformed into the following equation (36).

$$dth = -Tf/(D \cdot s + K) \qquad (36)$$

On the other hand, the maximum backlash error value BL can be expressed as:

$$K = Tf/BL \tag{37}$$

Erasing Tf from the equations (36) and (37) yields the following equation (38) giving the backlash compensation value dth.

$$dth = -\{K/(D \cdot s + K)\}BL \tag{38}$$

Then constants given by the following equations (39) to (41) are substituted into the above equation (32).

$$a0 = K \tag{39}$$

$$b1 = D \tag{40}$$

$$b0 = K \tag{41}$$

The other structure and operation of the machining system according to the seventh embodiment of the present invention are the same as those of the machining system according to the sixth embodiment, and therefore the description of the other structure and operation of the machining system according to the seventh embodiment will be omitted hereinafter.

In this manner, the backlash showing a tendency to increase gradually can be compensated for with a high degree of accuracy by modeling the performance of the driving mechanism with the backlash showing a tendency to increase gradually using a model in which the backlash is assumed to be caused by a torsion spring with low torsional stiffness that poses a limitation on the maximum angle of torsion and a large viscous friction is exerted on a displacement of the torsion spring, and by substituting the characteristic values given by the above equations (39) to (41) with consideration given to the characteristics of the feedback control system, as constant values, into the equation (32).

As previously mentioned, in accordance with the seventh embodiment of the present invention, the performance of the driving mechanism with the backlash showing a tendency to increase gradually and the performance of the feedback control system can be modeled using a model in which the backlash is assumed to be caused by a torsion spring with low torsional stiffness that poses a limitation on the maximum angle of torsion and a large viscous friction is exerted on a displacement of the torsion spring. Furthermore, the characteristic values calculated with the modeling, as constant values, into the equation (32) representing the time-dependent filter. Accordingly, the machining system of the seventh embodiment can compensate for the backlash showing a tendency to increase gradually with a high degree of accuracy and reduce the backlash error to a constant level or less regardless of the magnitude of the feed velocity. In addition, since the machining system can significantly reduce the time required for performing arithmetic operations to compute a new backlash compensation value, it can machine an object with a high degree of accuracy, which prior art machining systems cannot be expected to provide.

Eighth Embodiment

Figure 11:
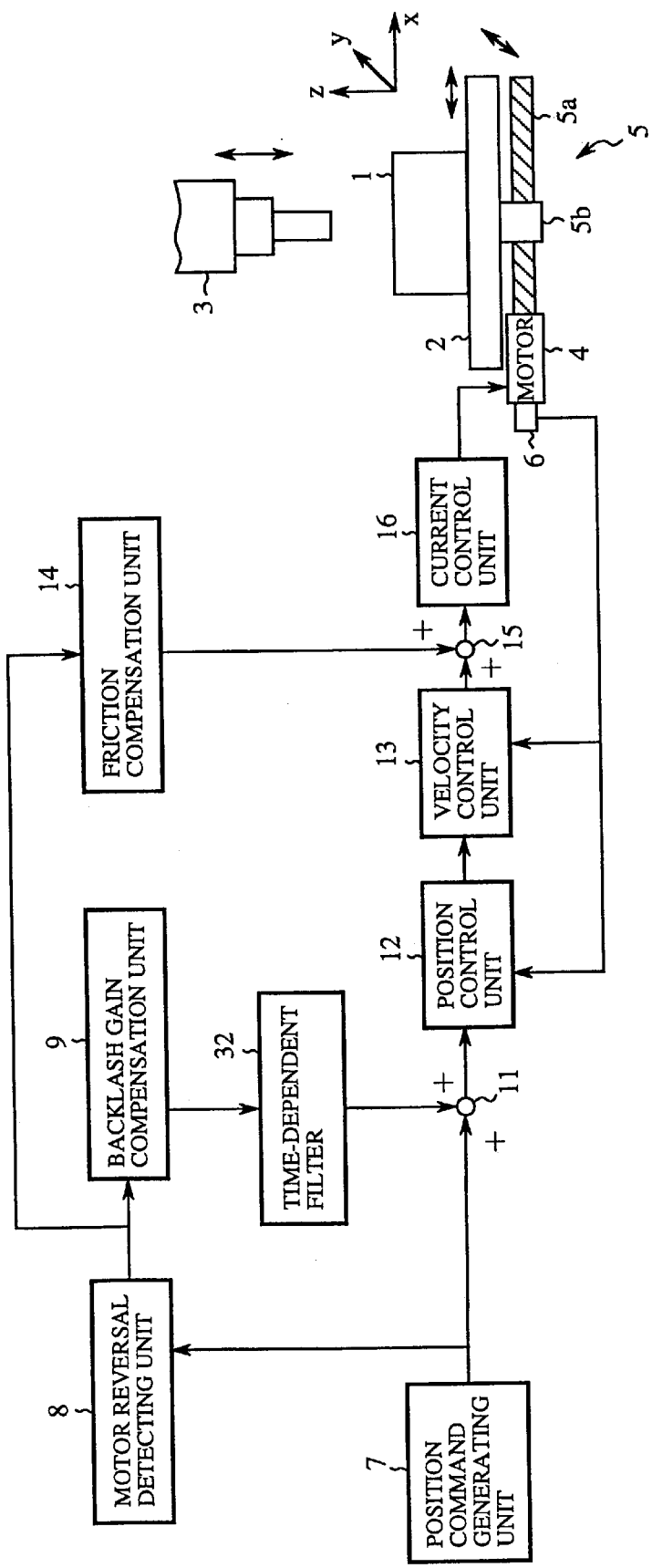
FIG. 11 is a block diagram showing the structure of a one-axis (e.g., X-axis) driving mechanism included with an NC machining system according to an eighth embodiment of the present invention.

Referring next to FIG. 11, there is illustrated a block diagram showing the structure of a one-axis (e.g., X-axis) driving mechanism included with an NC machining system according to an eighth embodiment of the present invention. In the figure, reference numeral 32 denotes a time-dependent filter for performing a filtering process, which is equivalent to a second order delay transfer function given by the following equation (42), on a compensated step signal from a backlash gain compensation unit 9 so as to reduce the amplitude of the compensated step signal, and for furnishing the reduced, compensated step signal as a position compensation signal (or backlash compensation value).

$$Y(s) = \{(a2 \cdot s^2 + a1 \cdot s + a0)/(b2 \cdot s^2 + b1 \cdot s + b0)\} X(s) \tag{42}$$

where a2, a1, a0, b2, b1, and b0 are constants, and s is the Laplace operator.

The other structure of the machining system of the eighth embodiment is the same as that of the machining system of the first embodiment. The same components as of the machining system of the first embodiment are designated by the same reference numerals, and therefore the description of those components will be omitted hereinafter.

As previously mentioned, in accordance with the eighth embodiment, since the time-dependent filter 32 performs a filtering process, which is equivalent to the second order delay transfer function given by the above equation (42), on the compensated step signal from the backlash gain compensation unit 9 so as to generate the position compensation signal, it can generate the position compensation signal with a few multiplication operations and addition operations. The machining system according to the eighth embodiment can thus obtain the backlash compensation value with the simple operations without having to perform exponential computations which needs many arithmetic operations, unlike prior art numerically controlled systems. Therefore the machining system can significantly reduce the time required for performing arithmetic operations to compute a new backlash compensation value. As a result, in addition to reducing the backlash error, caused by the table 2, the machine tool 3, and the servomotor 4, to a constant level or less regardless of the magnitude of the feed velocity, the machining system of the eighth embodiment can significantly reduce the time required for performing arithmetic operations to compute a new backlash compensation value and hence the length of intervals at which the target position for the position control is updated. Accordingly, the machining system of the eighth embodiment makes it possible to set the target position for every shorter distance through which the object to be controlled is moved, thus being able to machine the object to be machined with a higher degree of accuracy when the object to be controlled is moved at a low feed velocity.

The filtering process can be implemented via software. In this case, the filtering process can be performed based on the following equation (43) into which the above equation (42) represented with the Laplace operator s is z-converted, for example.

$$Y(z) = [\{(4 \cdot a2 + 2 \cdot a1 \cdot T + a0 \cdot T^2) z^2 + (-8 \cdot a2 + 2 \cdot a0 \cdot T^2) z$$

$$+ (4 \cdot a2 - 2 \cdot a1 \cdot T + a0 \cdot T^2)\} / \{(4 \cdot b2 + 2 \cdot b1 \cdot T + b0 \cdot T^2) z^2$$

$$+ (-8 \cdot b2 + 2 \cdot b0 \cdot T^2) z + (4 \cdot b2 - 2 \cdot b1 \cdot T + b0 \cdot T^2)\}] X(z) \tag{43}$$

where T is the sampling time of the control system.

Ninth Embodiment

In accordance with a ninth embodiment of the present invention, constants given by the following equations (44) to (49) are substituted into the above equation (42).

$$a2 = K \tag{44}$$

$$a1 = K(KP + KI) \tag{45}$$

$$a0 = K \cdot KP \cdot KI \tag{46}$$

$$b2 = D \cdot KP \tag{47}$$

$$b1=KP(D \cdot KI+K) \qquad (48)$$

$$b0=K \cdot KP \cdot KI \qquad (49)$$

where K is the spring constant of a spring element placed between an object to be controlled and a driving unit or servomotor, D is a coefficient of viscosity of a viscous friction exerted on the spring element, KP is a position loop proportional gain included in a position control unit, and KI is a velocity loop integral gain included in a velocity control unit.

By measuring the time-varying backlash error, D can be set so that the backlash compensation value varies with time in a manner similar to that the backlash error varies with time.

The other structure and operation of the machining system according to the ninth embodiment of the present invention are the same as those of the machining system according to the eighth embodiment, and therefore the description of the other structure and operation of the machining system according to the ninth embodiment will be omitted hereinafter.

By measuring the dynamic friction torque Tf and the maximum backlash error value BL, the spring constant K is determined by the following equation (50).

$$K=Tf/BL \qquad (50)$$

In the model as shown in FIG. 11 in which the driving mechanism with backlash showing a tendency to increase gradually and the feedback control system are modeled, the backlash compensation value dth to eliminate the effect of the dynamical friction torque Tf on the table position thL can be calculated with the following equation (51).

$$dth=-(JM \cdot s^2 \cdot s+KP \cdot V)Tf/\{(D \cdot s+K)KP \cdot V\}=-\{JM \cdot s^3+KV \cdot s^2+KV(KP+KI)s+KP \cdot KV \cdot KI\} \cdot K \cdot BL/[KP \cdot KV\{D \cdot s^2+(D \cdot KI+K)s+K \cdot KI\}] \qquad (51)$$

where JM is an inertia of the driving unit, $V=KV(1+KI/s)$, and KV is a velocity loop proportional gain included in the velocity control unit 13. By omitting the term of $s^3$ included in the numerator of the equation (51) because the dynamical friction torque Tf varies in steps, and therefore, cannot be differentiated, the backlash compensation value in consideration with the response delay in the numerically control device is represented by the following equation (52):

$$dth=-[\{K \cdot s^2+K(KP+KI)s+K \cdot KP \cdot KI\}/\{KP \cdot D \cdot s^2+KP(D \cdot KI+K)s+K \cdot KP \cdot KI\}]BL \qquad (52)$$

In this manner, the backlash showing a tendency to increase gradually can be compensated for with a high degree of accuracy by modeling the performance of the driving mechanism with the backlash showing a tendency to increase gradually using a model in which the backlash is assumed to be caused by a torsion spring with low torsional stiffness that poses a limitation on the maximum angle of torsion and a large viscous friction is exerted on a displacement of the torsion spring, and by substituting the characteristic values given by the above equations (44) to (49) with consideration given to the characteristics of the feedback control system, as constant values, into the equation (42).

As previously mentioned, in accordance with the ninth embodiment of the present invention, the performance of the driving mechanism with the backlash showing a tendency to increase gradually and the performance of the feedback control system can be modeled using a model in which the backlash is assumed to be caused by a torsion spring with low torsional stiffness that poses a limitation on the maximum angle of torsion and a large viscous friction is exerted on a displacement of the torsion spring. Furthermore, the characteristic values calculated with the above equations (44) to (49) with consideration given to the response delay in the control device, as constant values, into the equation (42) representing the time-dependent filter. Accordingly, the machining system of the ninth embodiment can reduce the backlash error showing a tendency to increase gradually to a constant level or less regardless of the magnitude of the feed velocity. In addition, since the machining system can reduce the time required for performing arithmetic operations to compute a new backlash compensation value, it can machine an object with a high degree of accuracy, which prior art machining systems cannot be expected to provide.

Tenth Embodiment

Figure 12:
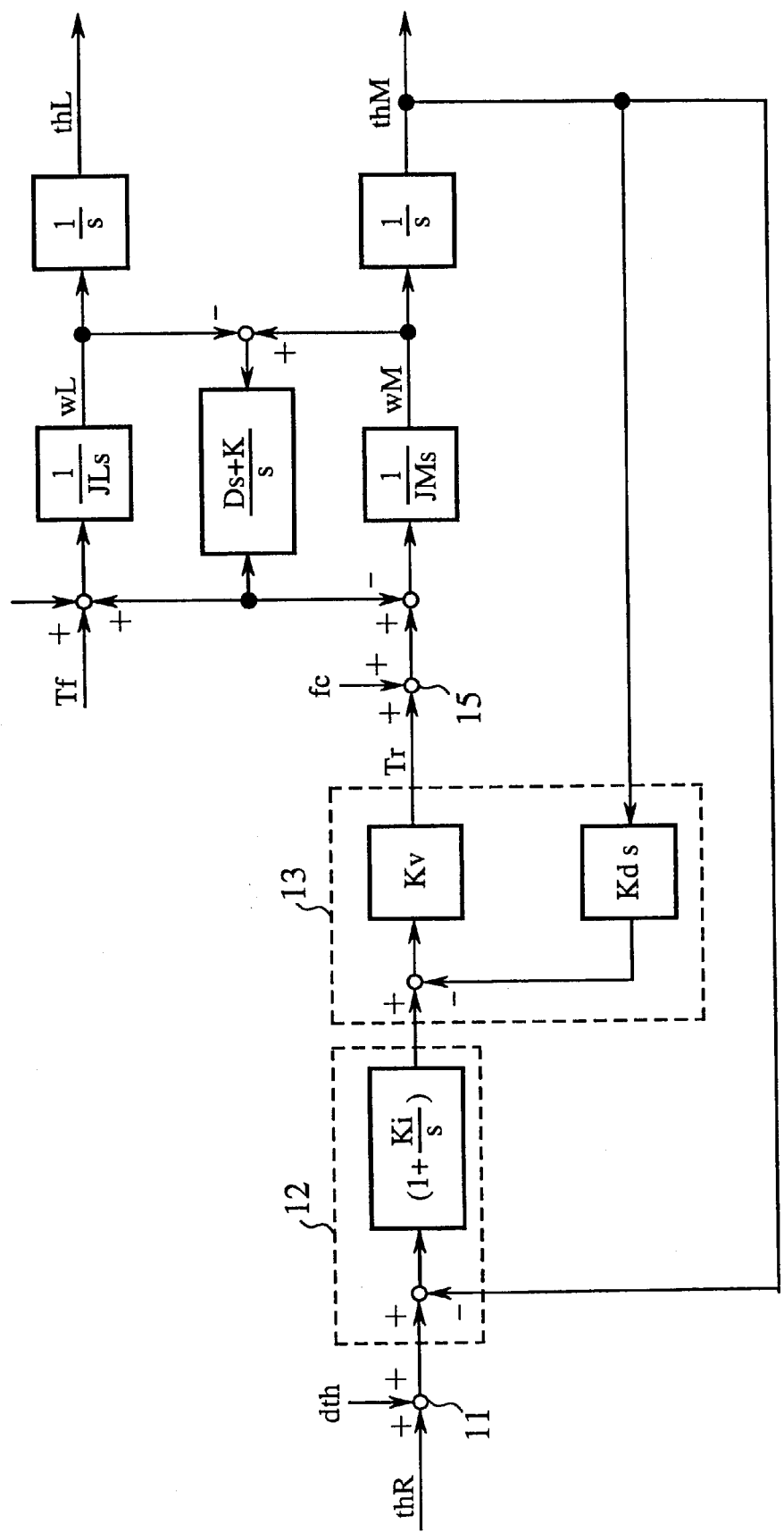
FIG. 12 is a control block diagram of a model in which a driving mechanism with backlash showing a tendency to increase gradually and a feedback control system having a structure different from that of the feedback control system of the above-mentioned seventh embodiment, in accordance with a tenth embodiment of the present invention, the model being represented by the Laplace operator s.

Referring next to FIG. 12, there is illustrated a control block diagram of a model in which a driving mechanism with backlash showing a tendency to increase gradually and a feedback control system having a structure different from that of the feedback control system of the above-mentioned seventh embodiment, the model being represented by the Laplace operator s. In the figure, thR is a rotation angle command or position command, dth is a backlash compensation value, Tr is a torque command, Tf is a dynamical friction torque, fc is a friction compensation torque, wM is a motor rotation angular velocity, thM is a motor rotation angle, and thL is a table position whose value is converted to an equivalent value corresponding to the motor rotation angle. The friction compensation torque fc has the same magnitude as the dynamical friction torque Tf and has a sign opposite to that of the dynamical friction torque Tf, in order to eliminate the effect of the dynamical friction torque Tf.

In addition, JL is an inertia of an object to be controlled, JM is an inertia of a driving unit or servomotor, K is the spring constant of a spring element placed between the servomotor 4 and the table 2, D is a coefficient of viscosity of a viscous friction exerted on the spring element, Ki is a position loop integral gain included in a position control unit 12, Kv is a position loop proportional gain included in a velocity control unit 13, and Kd is a differential gain included in the velocity control unit 13. Since a current control unit 16 has a high response, it can be assumed that the term associated with the current control unit 16 is neglected.

In the above-mentioned model, a table position thL is given by the following equation (53) using the rotation angle command thR, the backlash compensation value dth, and the dynamical friction torque Tf.

$$thL=\{P \cdot Kv(D \cdot s+K)(thR+dth)+(JM \cdot s^2+Kv \cdot Kd \cdot s+P \cdot Kv)Tf\}/(A \cdot s^2+B \cdot Kv \cdot Kd \cdot s+B \cdot P \ Kv) \qquad (53)$$

where $P=(1+Ki/s)$, $A=JL \cdot JM \cdot s^2+(JL+JM)D \cdot s+(JL+JM)K$, and $B=JL \cdot s^2+D \cdot s+K$.

The backlash compensation value dth to eliminate the effect of the dynamical friction torque Tf exerted on the table position thL is calculated with the following equation (54).

$$dth=-(JM \cdot s^3+Kv \cdot Kd \cdot s^2+Kv \cdot s+Kv \cdot Ki)Tf/\{Kv \cdot D \cdot s^2+Kv(D \cdot Ki+K)s+K \cdot Kv \cdot Ki\} \qquad (54)$$

By omitting the term of $s^3$ included in the numerator of the equation (54) because the dynamical friction torque Tf varies in steps, and therefore, cannot be differentiated, the above equation (54) can be transformed into the following equation (55).

$$dth=-(Kd \cdot s^2+s+Ki)Tf/\{D \cdot s^2+(D \cdot Ki+K)s+K \cdot Ki\} \qquad (55)$$

On the other hand, the maximum backlash error BL can be expressed as:

$$K = Tf/BL \qquad (56)$$

Erasing Tf from the equations (55) and (56) yields the following equation (57) giving the backlash compensation value dth.

$$dth = -[(K \cdot Kd \cdot s^2 + K \cdot s + K \cdot Ki)/\{D \cdot s^2 + (D \cdot Ki + K)s + K \cdot Ki\}]BL \qquad (57)$$

Then constants given by the following equations (58) to (63) are substituted into the equation (42).

$$a2 = K \cdot Kd \qquad (58)$$

$$a1 = K \qquad (59)$$

$$a0 = K \cdot Ki \qquad (60)$$

$$b2 = D \qquad (61)$$

$$b1 = D \cdot Ki + K \qquad (62)$$

$$b0 = K \cdot Ki \qquad (63)$$

The other structure and operation of the machining system according to the tenth embodiment of the present invention are the same as those of the machining system according to the eighth embodiment, and therefore the description of the other structure and operation of the machining system according to the tenth embodiment will be omitted hereinafter.

In this manner, the backlash showing a tendency to increase gradually can be compensated for with a high degree of accuracy by modeling the performance of the driving mechanism with the backlash showing a tendency to increase gradually using a model in which the backlash is assumed to be caused by a torsion spring with low torsional stiffness that poses a limitation on the maximum angle of torsion and a large viscous friction is exerted on a displacement of the torsion spring, and by substituting the characteristic values given by the above equations (58) to (63), as constant values, into the equation (42).

As previously mentioned, in accordance with the tenth embodiment of the present invention, the performance of the driving mechanism with the backlash showing a tendency to increase gradually can be modeled using a model in which the backlash is assumed to be caused by a torsion spring with low torsional stiffness that poses a limitation on the maximum angle of torsion and a large viscous friction is exerted on a displacement of the torsion spring. Furthermore, the characteristic values calculated with the modeling, as constant values, into the equation (42) representing the time-dependent filter. Accordingly, the machining system of the tenth embodiment can reduce the backlash error showing a tendency to increase gradually to a constant level or less regardless of the magnitude of the feed velocity. In addition, since the machining system can significantly reduce the time required for performing arithmetic operations to compute a new backlash compensation value, it can machine an object with a high degree of accuracy, which prior art machining systems cannot be expected to provide.

Eleventh Embodiment

Figure 13:
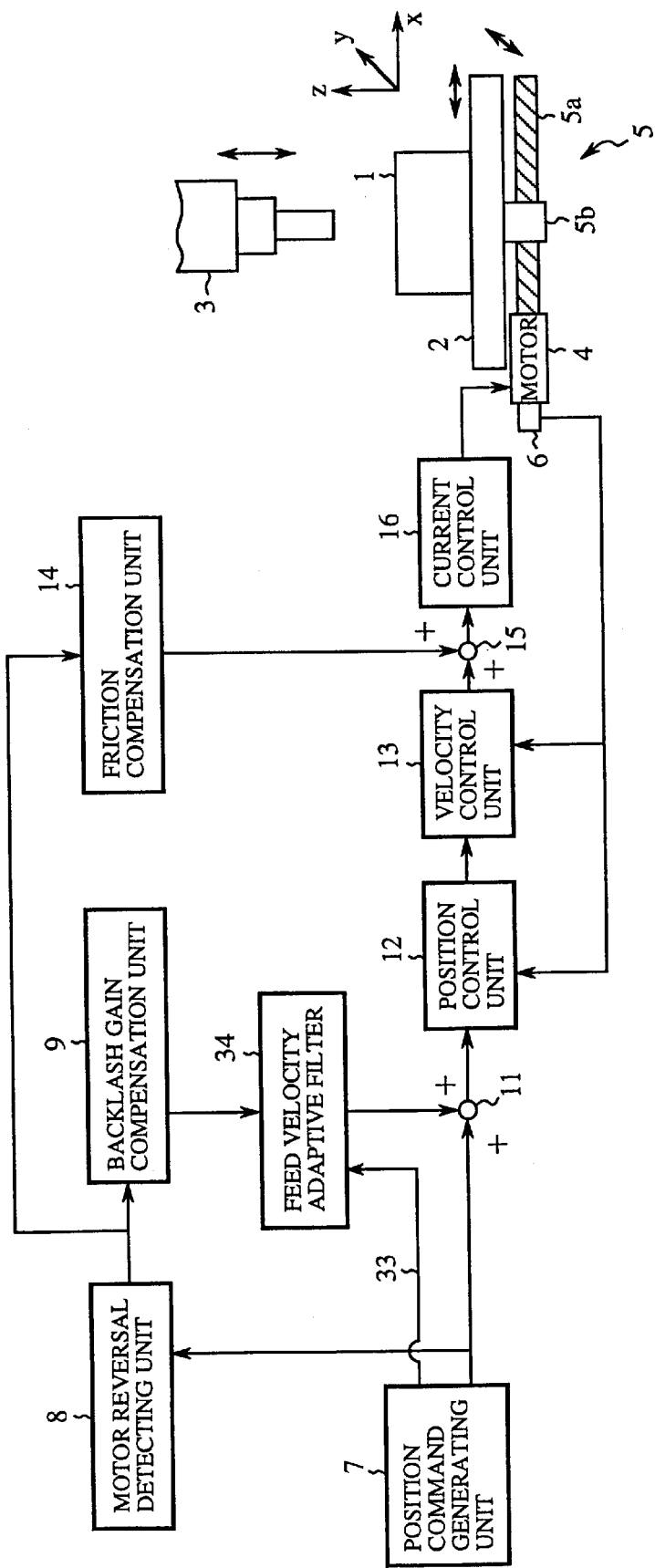
FIG. 13 is a block diagram showing the structure of a one-axis (e.g., X-axis) driving mechanism included with an NC machining system according to an eleventh embodiment of the present invention.
Figure 14:
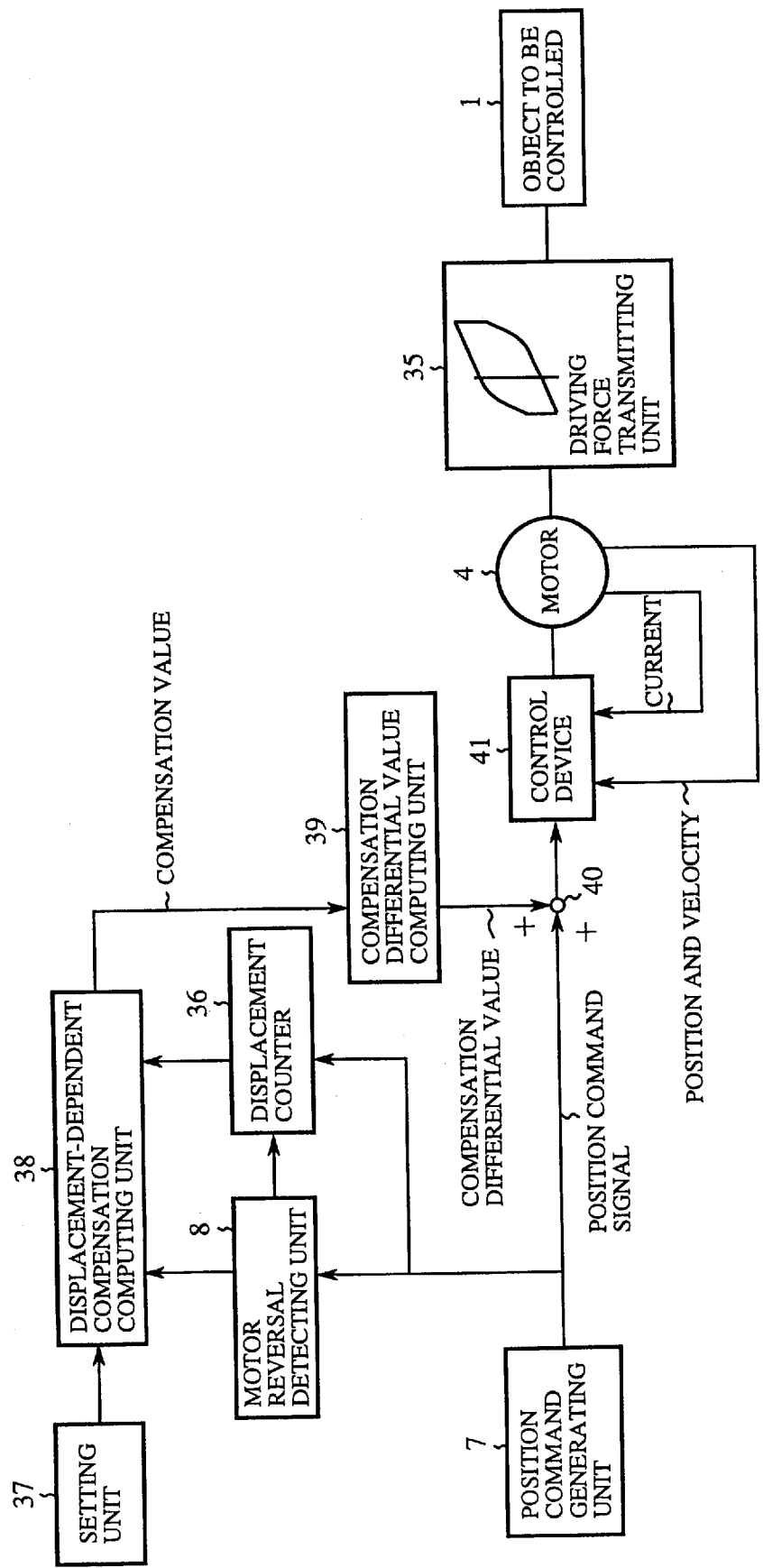
FIG. 14 is a block diagram showing the structure of a prior art numerically controlled system.

Referring next to. FIG. 13, there is illustrated a block diagram showing the structure of a one-axis (e.g., X-axis) driving mechanism included with an NC machining system according to an eleventh embodiment of the present invention. In the figure, reference numeral 33 denotes a signal line via which desired (or target) feed velocity information furnished by a position command generating unit 7 is transmitted, and numeral 34 denotes a feed velocity adaptive filter unit provided with a plurality of transfer-function filters each of which performs a filtering process on an output of a backlash gain compensation unit 9 according to an identical transfer function, and each of which, however, has a set of constants, which defines the transfer function, different from that provided by any other transfer-function filter included in the feed velocity adaptive filter unit, for selecting one filter from among the plurality of transfer-function filters according to the target feed velocity and for performing a filtering process on the output of the backlash gain compensation unit 9 using the selected transfer-function filter.

In accordance with the eleventh embodiment, a set of constants that defines each of the plurality of transfer-function filters can be set in consideration with the fact that the friction phenomenon and hence Km and Dm vary as the feed velocity changes. For example, there can be provided three transfer-function filters corresponding to a feed velocity range of 50 to 300 mm/min, a feed velocity range of 300 to 2,000 mm/min, and a feed velocity range of 2,000 to 5,000 mm/min, respectively. In this case, each of the three filters performs the filtering process using the same set of constants for each feed velocity range. The other structure of the machining system according to the eleventh embodiment is the same as that of the machining system according to the aforementioned first embodiment, and the same components as of the machining system according to the first embodiment are designated by the same reference numerals as shown in FIG. 1. Therefore the description of the other structure will be omitted hereinafter.

When a position command generating unit 7 sends out target feed velocity information as well as a position command signal, the feed velocity adaptive filter unit 34 determines the feed velocity based on the target feed velocity information and selects one transfer-function filter associated with a specified feed velocity range including the determined feed velocity. The feed velocity adaptive filter unit 34 then reduces the amplitude of a compensated step signal from the backlash gain compensation unit 9 using the selected transfer-function filter, and furnishes the reduced, compensated step signal as the position compensation signal. The other operation of the machining system of the eleventh embodiment is the same as that of the machining system of the aforementioned first embodiment, and therefore the description of the other operation will be omitted hereinafter.

As previously mentioned, in accordance with the eleventh embodiment, the feed velocity adaptive filter unit 34 is provided with a plurality of transfer-function filters that provide respective sets of different constants that define the transfer function provided by the feed velocity adaptive filter unit. The feed velocity-adaptive filter unit 34 selects one filter from among the plurality of transfer-function filters according to the target feed velocity and then performs a filtering process on an output of the backlash gain compensation unit 9 using the selected transfer-function filter. Accordingly, the machining system can add a backlash compensation value to the position command signal for every feed velocity range to reduce the backlash error, thus improving the advantage of reducing the backlash error over a full feed velocity range. In addition, the machining system can machine an object into a perfect circle with a high degree of accuracy at a lower feed velocity.

As mentioned above, the machining system according to the eleventh embodiment of the present invention is based on the structure of the machining system according to the aforementioned first embodiment. As an alternative, the machining system according to the eleventh embodiment of the present invention can be based on the structure of the machining system according to either of the second to tenth embodiments. Even in this case, the same advantage is provided.

Comparisons among the filtering processes performed by the second through tenth embodiments shown can be made as follows. In the second and third embodiments, the backlash error produced by the driving mechanism using the servomotor 4 and X-axis ballscrew 5 can be compensated for effectively. In the fourth and fifth embodiments, the response delay in the control device (or servo control system) can be further compensated for effectively. In the sixth and seventh embodiments, the backlash error can be compensated for effectively when the response delay in the control device is sufficiently small as compared with the response delay in the driving mechanism. In the eighth to tenth embodiments, even when the control device (or servo control system) consists of a velocity control loop and a position control loop and a response delay occurs in the control device, the backlash error can be compensated for effectively.

It is apparent from a comparison between the ninth and tenth embodiments that while the ninth embodiment offers the advantage of being able to compensate for the backlash error effectively regardless of a response delay in the control device when the control device includes an integral element in the velocity control unit thereof, the tenth embodiment offers the advantage of being able to compensate for the backlash error effectively regardless of a response delay in the control device when the control device includes an integral element in the position control unit thereof.

Many widely different embodiments of the present invention may be constructed without departing from the spirit and scope of the present invention. It should be understood that the present invention is not limited to the specific embodiments described in the specification, except as defined in the appended claims.

What is claimed is:

1. A backlash compensation device for use with a numerically controlled system, for compensating for a position command signal used to drive and control an object to be controlled, said device comprising:

reversal detecting means for detecting a reversal of a direction of driving the object to be controlled based on a reversal of an upward or downward trend in the level of the position command signal applied thereto, and for furnishing reversal detection information when detecting a reversal of a direction of driving the object to be controlled;

maximum backlash signal generating means for generating a maximum backlash signal corresponding to a maximum value of backlash error associated with a direction in which the object to be controlled will be moved after the detected reversal of the driving direction, every time said maximum backlash signal generating means receives the reversal detection information from said reversal detecting means;

filter means for reducing the level of the maximum backlash signal from said maximum backlash signal generating means according to how much time has elapsed since the detected reversal of the driving direction, and for furnishing the reduced maximum backlash signal; and addition means for adding the reduced maximum backlash signal from said filter means to the position command signal, and for furnishing the addition result as a compensated position command signal.

2. The backlash compensation device according to claim 1, wherein said filter means includes a plurality of transfer-function filters, each of which can transform an input signal from said maximum backlash signal generating means according to an identical transfer function, and each of which has a set of constants which defines the transfer function, different from that provided by any other transfer-function filter included in said filter means, for selecting one of said plurality of transfer-function filters according to a feed velocity of the object to be controlled so as to perform a filtering process on the maximum backlash signal from said maximum backlash signal generating means using the selected transfer-function filter.

3. The backlash compensation device according to claim 1, wherein said filter means performs a specific filtering process on the maximum backlash signal from said maximum backlash signal generating means, the filtering process being equivalent to a transfer function expressed as:

$$a0/(b2 \cdot s^2 + b1 \cdot s + b0)$$

where a0, b2, b1, and b0 are constants, and s is the Laplace operator.

4. The backlash compensation device according to claim 2, wherein each of said plurality of transfer-function filters included in said filter means performs a specific filtering process on the maximum backlash signal from said maximum backlash signal generating means, the filtering process being equivalent to a transfer function expressed as:

$$a0/(b2 \cdot s^2 + b1 \cdot s + b0)$$

where a0, b2, b1, and b0 are constants, and s is the Laplace operator.

5. The backlash compensation device according to claim 1, wherein said filter means performs a specific filtering process on the maximum backlash signal from said maximum backlash signal generating means, the filtering process being equivalent to a transfer function expressed as:

$$(a1 \cdot s + a0)/(b2 \cdot s^2 + b1 \cdot s + b0)$$

where a0, b2, b1, and b0 are constants, and s is the Laplace operator.

6. The backlash compensation device according to claim 2, wherein each of said plurality of transfer-function filters included in said filter means performs a specific filtering process on the maximum backlash signal from said maximum backlash signal generating means, the filtering process being equivalent to a transfer function expressed as:

$$(a1 \cdot s + a0)/(b2 \cdot s^2 + b1 \cdot s + b0)$$

where a0, b2, b1, and b0 are constants, and s is the Laplace operator.

7. The backlash compensation device according to claim 1, wherein said filter means performs a specific filtering process on the maximum backlash signal from said maximum backlash signal generating means, which is equivalent to a transfer function expressed as:

$$a0/(b1 \cdot s + b0)$$

where a0, b2, b1, and b0 are constants, and s is the Laplace operator.

8. The backlash compensation device according to claim 2, wherein each of said plurality of transfer-function filters included in said filter means performs a specific filtering process on the maximum backlash signal from said maximum backlash signal generating means, which is equivalent to a transfer function expressed as:

$$a0/(b1 \cdot s + b0)$$

where a0, b2, b1, and b0 are constants, and s is the Laplace operator, on the maximum backlash signal from said maximum backlash signal generating means.

9. The backlash compensation device according to claim 1, wherein said filter means performs a specific filtering process on the maximum backlash signal from said maximum backlash signal generating means, the filtering process being equivalent to a transfer function expressed as:

$$(a2 \cdot s^2 + a1 \cdot s + a0)/(b2 \cdot s^2 + b1 \cdot s + b0)$$

where a2, a1, a0, b2, b1, and b0 are constants, and s is the Laplace operator.

10. The backlash compensation device according to claim 2, wherein each of said plurality of transfer-function filters included in said filter means performs a specific filtering process on the maximum backlash signal from said maximum backlash signal generating means, the filtering process being equivalent to a transfer function expressed as:

$$(a2 \cdot s^2 + a1 \cdot s + a0)/(b2 \cdot s^2 + b1 \cdot s + b0)$$

where a2, a1, a0, b2, b1, and b0 are constants, and s is the Laplace operator.

11. A numerically controlled system including a backlash compensation device for compensating for a position command signal to generate a compensated position command signal, a control device for generating a control signal based on the compensated position command signal, and driving means for driving and controlling an object to be controlled according to the control signal, said backlash compensation device comprising:

reversal detecting means for detecting a reversal of a direction of driving the object to be controlled based on a reversal of an upward or downward trend in the level of the position command signal applied thereto, and for furnishing reversal detection information when detecting a reversal of a direction of driving the object to be controlled;

maximum backlash signal generating means for generating a maximum backlash signal corresponding to a maximum value of backlash error associated with a direction in which the object to be controlled will be moved after the detected reversal of the driving direction, every time said maximum backlash signal generating means receives the reversal detection information from said reversal detecting means;

filter means for reducing the level of the maximum backlash signal from said maximum backlash signal generating means according to how much time has elapsed since the detected reversal of the driving direction, and for furnishing the reduced maximum backlash signal; and addition means for adding the reduced maximum backlash signal from said filter means to the position command signal, and for furnishing the addition result as the compensated position command signal to said control device.

12. The numerically controlled system according to claim 11, wherein said filter means performs a specific filtering process on the maximum backlash signal from said maximum backlash signal generating means, the filtering process being equivalent to a transfer function expressed as:

$$(JL+JM)K/\{JL \cdot JM \cdot s^2 + (JL+JM)D \cdot s + (JL+JM)K\}$$

where JL is an inertia of the object to be controlled, JM is an inertia of said driving means, K is a spring constant of a spring element placed between the object to be controlled and said driving means, and D is a coefficient of viscosity of a viscous friction exerted on the spring element.

13. The numerically controlled system according to claim 11, wherein said filter means performs a specific filtering process on the maximum backlash signal from said maximum backlash signal generating means, the filtering process being equivalent to a transfer function expressed as:

$$\{(JL+JM)K \cdot Kf \cdot s + (JL+JM)K\}/\{JL \cdot JM\ s^2 + (JL+JM)D \cdot s + (JL+JM)K\}$$

where JL is an inertia of the object to be controlled, JM is an inertia of said driving means, K is a spring constant of a spring element placed between the object to be controlled and said driving means, D is a coefficient of viscosity of a viscous friction exerted on the spring element, and Kf is a constant for compensating for a response delay in said control device.

14. The numerically controlled system according to claim 11, wherein said filter means performs a specific filtering process on the maximum backlash signal from said maximum backlash signal generating means, the filtering process being equivalent to a transfer function expressed as:

$$K/(D \cdot s + K)$$

where K is a spring constant of a spring element placed between the object to be controlled and said driving means, and D is a coefficient of viscosity of a viscous friction exerted on the spring element.

15. The numerically controlled system according to claim 11, wherein said filter means performs a specific filtering process on the maximum backlash signal from said maximum backlash signal generating means, the filtering process being equivalent to a transfer function expressed as:

$$\{K \cdot s^2 + K(KP+KI)s + K \cdot KP \cdot KI\}/\{D \cdot KP \cdot s^2 + KP(D \cdot KI+K)s + K \cdot KP \cdot KI\}$$

where K is a spring constant of a spring element placed between the object to be controlled and said driving means, D is a coefficient of viscosity of a viscous friction exerted on the spring element, KP is a position loop proportional gain included with said control device, KV is a velocity loop proportional gain included with said control device, and KI is a velocity loop integral gain included with said control device.

16. The numerically controlled system according to claim 11, wherein said filter means performs a specific filtering process on the maximum backlash signal from said maximum backlash signal generating means, the filtering process being equivalent to a transfer function expressed as:

$$(K \cdot Kd \cdot s^2 + K \cdot s + K \cdot Ki)/\{D \cdot s^2 + (D \cdot Ki+K)s + K \cdot Ki\}$$

where K is a spring constant of a spring element placed between the object to be controlled and said driving means, D is a coefficient of viscosity of a viscous friction exerted on the spring element, Ki is a position loop integral gain included with said control device, and Kd is a differential gain included with said control device.

* * * * *